(12) United States Patent
Tokuyama

(10) Patent No.: US 7,826,325 B2
(45) Date of Patent: Nov. 2, 2010

(54) RECORDING AND REPRODUCING APPARATUS AND DEFECT DETERMINATION METHOD

(75) Inventor: Kazutatsu Tokuyama, Tokyo (JP)

(73) Assignee: Sony Corporation, Tokyo (JP)

( * ) Notice: Subject to any disclaimer, the term of this patent is extended or adjusted under 35 U.S.C. 154(b) by 694 days.

(21) Appl. No.: 11/622,320

(22) Filed: Jan. 11, 2007

(65) Prior Publication Data

US 2007/0171796 A1 Jul. 26, 2007

(30) Foreign Application Priority Data

Jan. 24, 2006 (JP) .............................. 2006-014951

(51) Int. Cl.
*G11B 7/00* (2006.01)
(52) U.S. Cl. ..................................... 369/103
(58) Field of Classification Search .................. None
See application file for complete search history.

(56) References Cited

U.S. PATENT DOCUMENTS

| 7,116,626 B1 * | 10/2006 | Woods et al. ............... 369/103 |
| 2004/0223200 A1 * | 11/2004 | Waldman et al. .............. 359/15 |
| 2006/0203690 A1 * | 9/2006 | Uchida et al. ............... 369/103 |
| 2006/0215527 A1 * | 9/2006 | Uchida et al. ............... 369/103 |

FOREIGN PATENT DOCUMENTS

| JP | 50-156459 | 12/1975 |
| JP | 10-038961 | 2/1998 |
| JP | 2004-289571 | 10/2004 |
| JP | 2006-004498 | 1/2006 |
| JP | 2006-252699 | 9/2006 |

OTHER PUBLICATIONS

Nikkei Electronics, Jan. 17, 2005, pp. 105-114.
Japanese Office Action for corresponding JP2006-014951 issued on Mar. 23, 2010.

\* cited by examiner

*Primary Examiner*—Christopher R Lamb
(74) *Attorney, Agent, or Firm*—K&L Gates LLP

(57) ABSTRACT

A recording and reproducing apparatus for recording data to and reproducing data from a hologram recording medium is provided. The recording and reproducing apparatus includes a light emitting unit for emitting light to be directed to the recording medium set at a predetermined position, a spatial light modulation unit for performing spatial light modulation on incident light by pixels, an image sensor for receiving incident light by pixels and converting the incident light into an electrical signal, an optical system for guiding the light emitted by the light emitting unit to the recording medium via the spatial light modulation unit while guiding, to the image sensor, light reflected from the recording medium in response to the light emitted by the light emitting unit, and a determination unit for controlling the spatial light modulation unit.

6 Claims, 22 Drawing Sheets

SLM PIXEL DEFECT

IMAGE DEFECT (DUE TO Gw)
OBJECTIVE LENS

INCIDENT LIGHT ON IMAGE SENSOR
IMAGE DEFECT (DUE TO Gr)

IMAGE SENSOR PIXEL DEFECT

IMAGE DEFECT Gw, SLM IMAGE DEFECT, IMAGE DEFECT Gr, AND IMAGE SENSOR IMAGE DEFECT

FIG. 12A

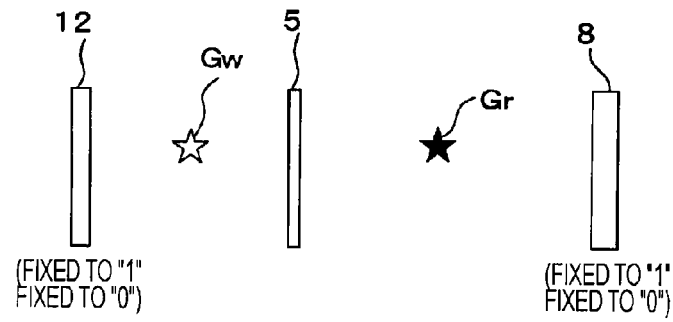

FIG. 12B

| TYPE OF DEFECT | MODULATION BY SLM WITH LD ON | | LD OFF |
|---|---|---|---|
| | bit1 | bit0 | |
| NO DEFECTS | 1 | 0 | 0 |
| RECORDING SIDE ONLY (SLM FIXED TO BIT 1) | 1 | 1 | 0 |
| REPRODUCING SIDE (SENSOR IS DEFINITELY FIXED TO BIT 1)<br><br>RECORDING SIDE AND REPRODUCING SIDE (COMBINATION OF SENSOR FIXED BIT 1 AND SLM FIXED BIT 1 OR BIT 0, Gr, AND Gw) | 1 | 1 | (1) |
| REPRODUCING SIDE ONLY<br>(• ONLY SENSOR FIXED TO BIT 0<br>• SENSOR FIXED BIT 0 AND Gr<br>• ONLY Gr)<br>RECORDING SIDE ONLY<br>(• SLM FIXED TO BIT 0<br>• SLM FIXED TO BIT 0 AND Gw<br>• ONLY Gw)<br>BOTH RECORDING SIDE AND REPRODUCING SIDE<br>(• COMBINATION OF SENSOR FIXED TO BIT 0 AND SLM FIXED TO BIT 0 OR BIT 1, Gr, AND Gw<br>• Gr AND Gw<br>• Gr, Gw, AND SLM FIXED TO BIT 0 OR BIT 1<br>• Gr AND SLM FIXED TO BIT 0 OR BIT 1) | 0 | 0 | 0 |

… # RECORDING AND REPRODUCING APPARATUS AND DEFECT DETERMINATION METHOD

CROSS REFERENCES TO RELATED APPLICATIONS

The present application claims priority to Japanese Patent Application JP 2006-014951 filed in the Japanese Patent Office on Jan. 24, 2006, the entire contents of which are incorporated herein by reference.

BACKGROUND

The present disclosure relates to a recording and reproducing apparatus for recording data to and reproducing data from a hologram recording medium and, in particular, to a defect determination method for determining the presence or absence of a defect occurring in an optical path.

In a hologram recording and reproducing method, in particular, the one using an optical storage, a spatial light modulator (SLM) such as a liquid-crystal panel or a digital micromirror device (DMD) is employed as a light intensity modulator to perform intensity modulation on a signal light ray to result in a pattern of bit 1 (high light intensity) and bit 0 (low light intensity). The signal light modulated in accordance with recording data is directed to a hologram recording medium together with light ray called reference light separately directed thereto. In this way, an interference pattern between the signal light and the reference light is recorded on the hologram recording medium.

During data reproducing operation, diffracted light responsive to the interference pattern is obtained by directing only the reference light to the hologram recording medium. An image responsive to the diffracted light is focused on an image sensor such as a charge-coupled device (CCD) or a complementary oxide semiconductor (CMOS) sensor, and is thus detected. Data is thus reproduced based on the detected image data.

A known method is disclosed in Nikkei Electronics Magazine, Jan. 17, 2005 Issue, pp. 106-114.

Hologram recording and reproducing method is known. In this method, the factors listed below greatly affect signal qualities (such as signal-to-noise ratio (SNR) and an error rate):

a) pixel defect on a spatial light modulator (SLM),
b) pixel defect on an image sensor,
c) image defect originating from an optical system,
d) media performance (variation in recording sensitivity, diffraction efficiency, etc.), and
e) optical system performance (variations in recorded image and reproduced image due to aberrations, signal quality degradation due to stray light leaking into a detection system).

In particular, factors a) through c) greatly affect signal quality during recording and reproducing operations. The SNR and the error rate are constantly degraded. The factor a) means a defect in recorded data, and the factor b) means a defect in reproduced data. The factor c) is generated by dust sticking to a lens or the like in an optical path. The image defects thus created are likely to affect adversely the signal quality.

In the known hologram recording and reproducing method, no techniques are available to manage the pixel defect and the image defect occurring during the recording and reproducing operations. There is a need for managing these defects to prevent persistent degradation in the SNR and the error rate.

SUMMARY

In accordance with one embodiment, a recording and reproducing apparatus for recording data to and reproducing data from a hologram recording medium, includes a light emitting unit for emitting light to be directed to the recording medium set at a predetermined position, a spatial light modulation unit for performing spatial light modulation on incident light by pixel, an image sensor for receiving incident light by pixel and converting the incident light into an electrical signal, an optical system for guiding the light emitted by the light emitting unit to the recording medium via the spatial light modulation unit while guiding, to the image sensor, light reflected from the recording medium in response to the light emitted by the light emitting unit, and a determination unit for controlling the spatial light modulation unit so that each pixel within the spatial light modulation unit modulates the light incident thereon with a high/low intensity modulation in light intensity with the light emitting unit remaining switched on, and for determining the presence or absence of a defect in an optical path based on a determination as to whether a value indicative of high/low light intensity is obtained as a value detected on each pixel in the image sensor in response to the high/low intensity modulation.

The spatial light modulator is thus free from a defect in which data is modulated with a bit value opposite from a specified bit value. The image sensor is also free from a defect in which a detected value is inverted from a specified bit value.

The image sensor detects signals on pixels thereof in response to a high/low light intensity modulation of the spatial light modulator (with a bit 1 as a high level, and a bit 0 as a low level). The pixels on the spatial light modulator and the image sensor are considered to function normally if a detected value on the image sensor is bit 1 in response to a bit 1 (high level) modulation while a detected value is bit 0 in response to a bit 0 modulation. The optical system is also free from an image defect due to dust sticking or the like. The presence or absence of a defect in the optical path is determined by determining that the detected values on the image sensor obtained in response to the high/low light modulation of the spatial light modulator are values representing high/low levels.

In accordance with the embodiments, the apparatus determines the presence or absence of a defect in the optical path leading to a drop in recording and reproducing performance.

Additional features and advantages are described herein, and will be apparent from, the following Detailed Description and the figures.

BRIEF DESCRIPTION OF THE FIGURES

FIGS. 12A and 12B illustrate a positional relationship of the SLM, a hologram recording medium, the image sensor, the image defect on the recording side, and the image defect on the reproducing side, and likely detected value patterns;

DETAILED DESCRIPTION

A hologram recording and reproducing method used in a recording and reproducing apparatus 1 of one embodiment is described below prior to the discussion of the recording and reproducing apparatus 1.

Figure 1:
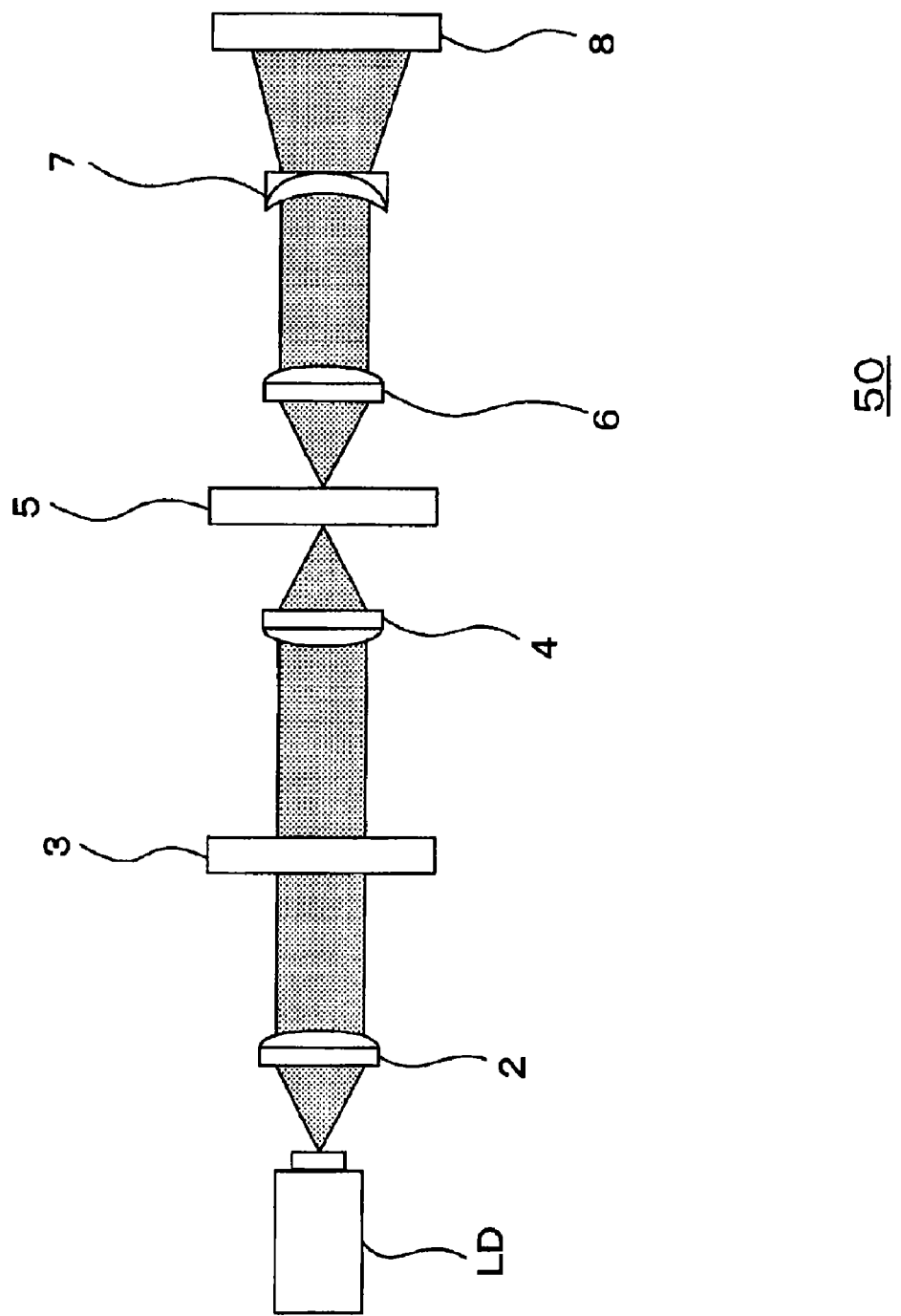
FIG. 1 illustrates a basic structure of a known recording and reproducing apparatus employing the same hologram recording and reproducing method as one embodiment.

FIG. 1 illustrates a known recording and reproducing apparatus 50 using the same hologram recording and reproducing method as the one used in the recording and reproducing apparatus 1 of the embodiment. FIG. 1 illustrates mainly an optical system with the rest thereof not shown.

In the hologram recording and reproducing method of one embodiment, data is recorded on to a hologram recording medium 5 with signal light and reference light in the same optical axis.

More specifically, the recording and reproducing apparatus 50 of FIG. 1 includes a laser diode LD as a light source for recording and reproducing data. The laser diode LD is a so-called single mode laser and emits laser light of a predetermined wavelength.

Laser light emitted from the laser diode LD is passed through a collimator lens 2 and converted into collimated light, which is then guided to a space light modulator (SLM) 3. The SLM 3 includes a transmissive-type liquid-crystal panel, for example.

During recording operation, the SLM 3 modulates the laser light in accordance with recording data, and the collimated light thus modulated is passed through an objective lens 4 into converged light. As shown, the converged light is focused onto the hologram recording medium 5 set at a predetermined location.

During reproducing operation, the laser light from the laser diode LD is guided onto the hologram recording medium 5 along the same optical path discussed above, and diffracted light responsive to recorded data is thus obtained. The diffracted light is collimated through an objective lens 6 and then focused on an image sensor 8 such as a charge-coupled device (CCD) or a complementary oxide semiconductor (CMOS) sensor via an expander lens 7.

FIG. 1 illustrates a transmissive-type optical system that reproduces data by allowing a laser light beam to pass through the hologram recording medium 5. Alternatively, a reflective-type optical system using a hologram recording medium with a reflective film may be used. When the reflective-type is used as will be described later, a polarized beam splitter may be used. The polarized beam splitter is used to split diffracted light resulting from light reflected from a hologram recording medium in response to laser light directed thereto and to guide a split beam to the image sensor 8.

Figure 2:
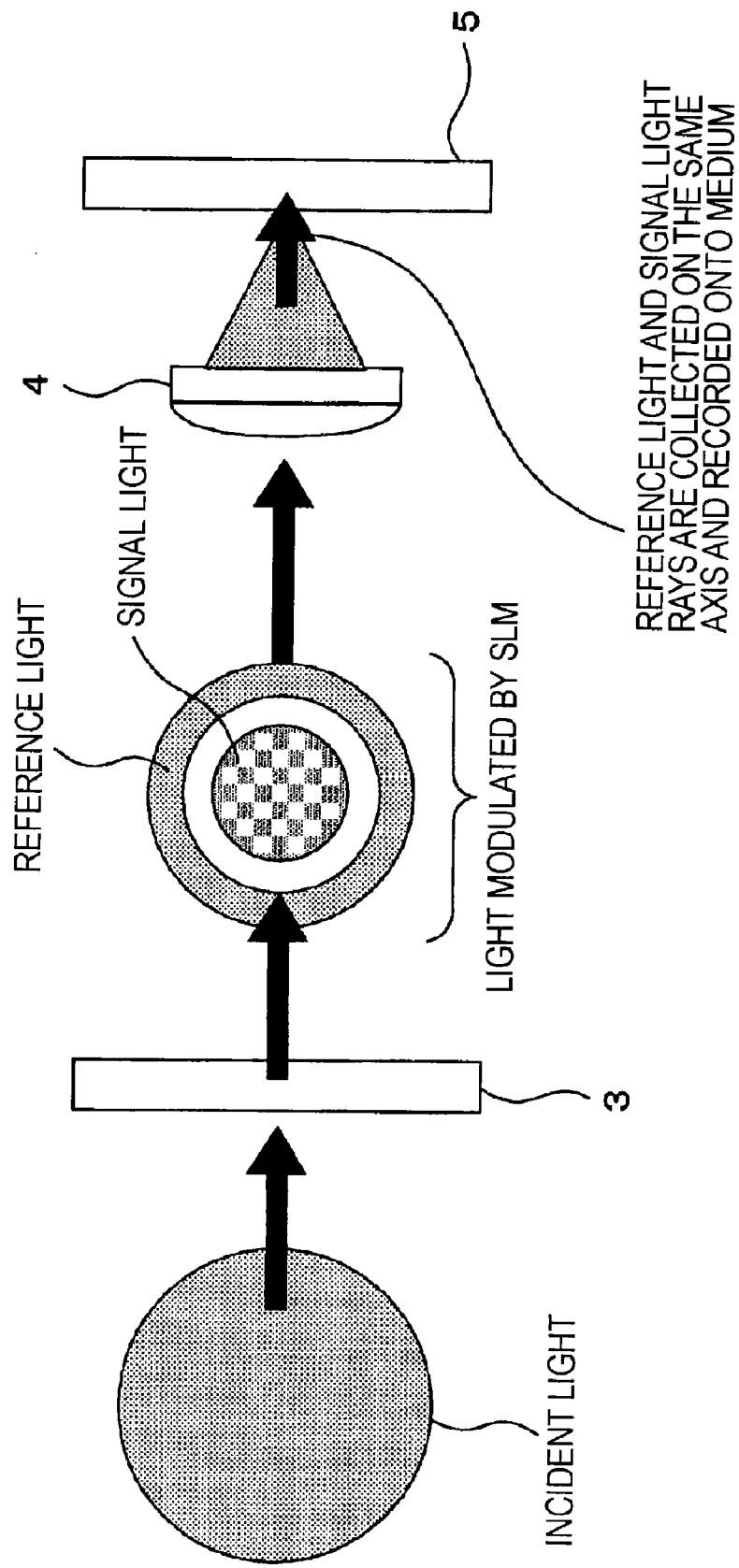
FIG. 2 illustrates a recording technique of a hologram recording medium.

FIG. 2 illustrates a recording method of recording data onto the hologram recording medium 5 in the recording and reproducing apparatus 50 of FIG. 1. FIG. 2 diagrammatically illustrates the SLM 3, the objective lens 4, the hologram recording medium 5, all shown in FIG. 1, collimated light (incident light) output from the collimator lens 2 to the SLM 3, light obtained through a modulation process of the SLM 3, and light directed onto the hologram recording medium 5 by the objective lens 4.

In accordance with the recording technique shown in FIG. 2, the SLM 3 performs intensity modulation on the incident light from the collimator lens 2 so that the reference light and light including a data arrangement of "0" and "1" (hereinafter referred to as signal light) are arranged in a co-axial fashion. The intensity-modulated light is then converged onto the hologram recording medium 5 through the objective lens 4, and a thus-created interference pattern of the reference light and the signal light is recorded as data onto the hologram recording medium 5.

Figure 3:
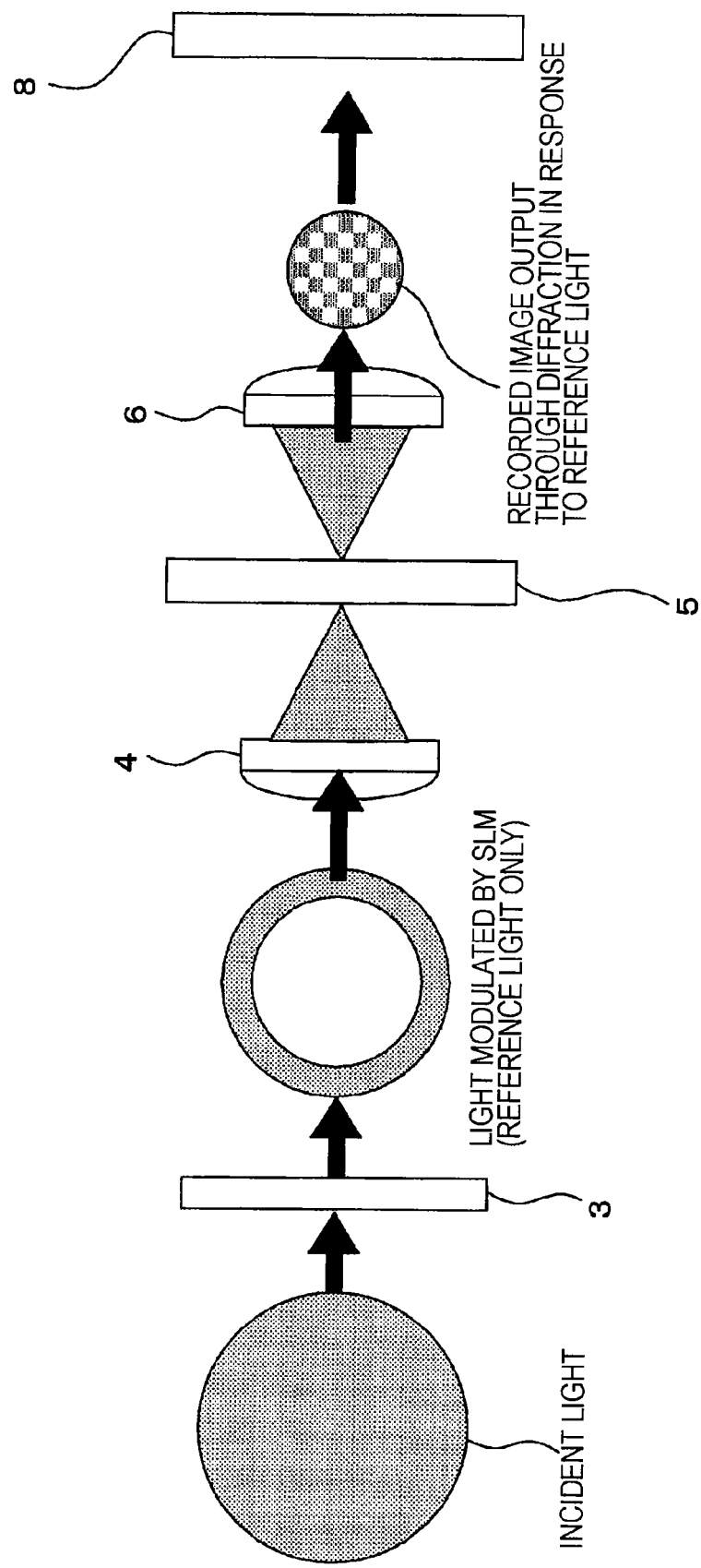
FIG. 3 illustrates a reproducing technique of the hologram recording medium.

FIG. 3 illustrates a reproducing technique of the hologram recording medium 5 in the recording and reproducing apparatus 50. FIG. 3 illustrates the SLM 3, the objective lens 4, the hologram recording medium 5, the objective lens 6, the image sensor 8, all shown in FIG. 1, collimated light (incident light) output from the collimator lens 2 and incident on the SLM 3, light obtained through a modulation process of the SLM 3, light directed onto the hologram recording medium 5 by the objective lens 4, and diffracted light emitted from the hologram recording medium 5.

As shown in FIG. 3, during the reproducing operation, the SLM 3 performs intensity modulation on the incident light from the collimator lens 2 so that a reference signal pattern only is output, and converges the reference signal pattern on the hologram recording medium 5. The converged light is then diffracted in accordance with the interference pattern of the data recorded on the hologram recording medium 5, and then passed through the hologram recording medium 5. The diffracted light has an intensity modulation pattern reflecting the recorded data as shown in FIG. 3. The image sensor 8 detects the intensity modulation pattern of the diffracted light, thereby reproducing the data.

Figure 4:
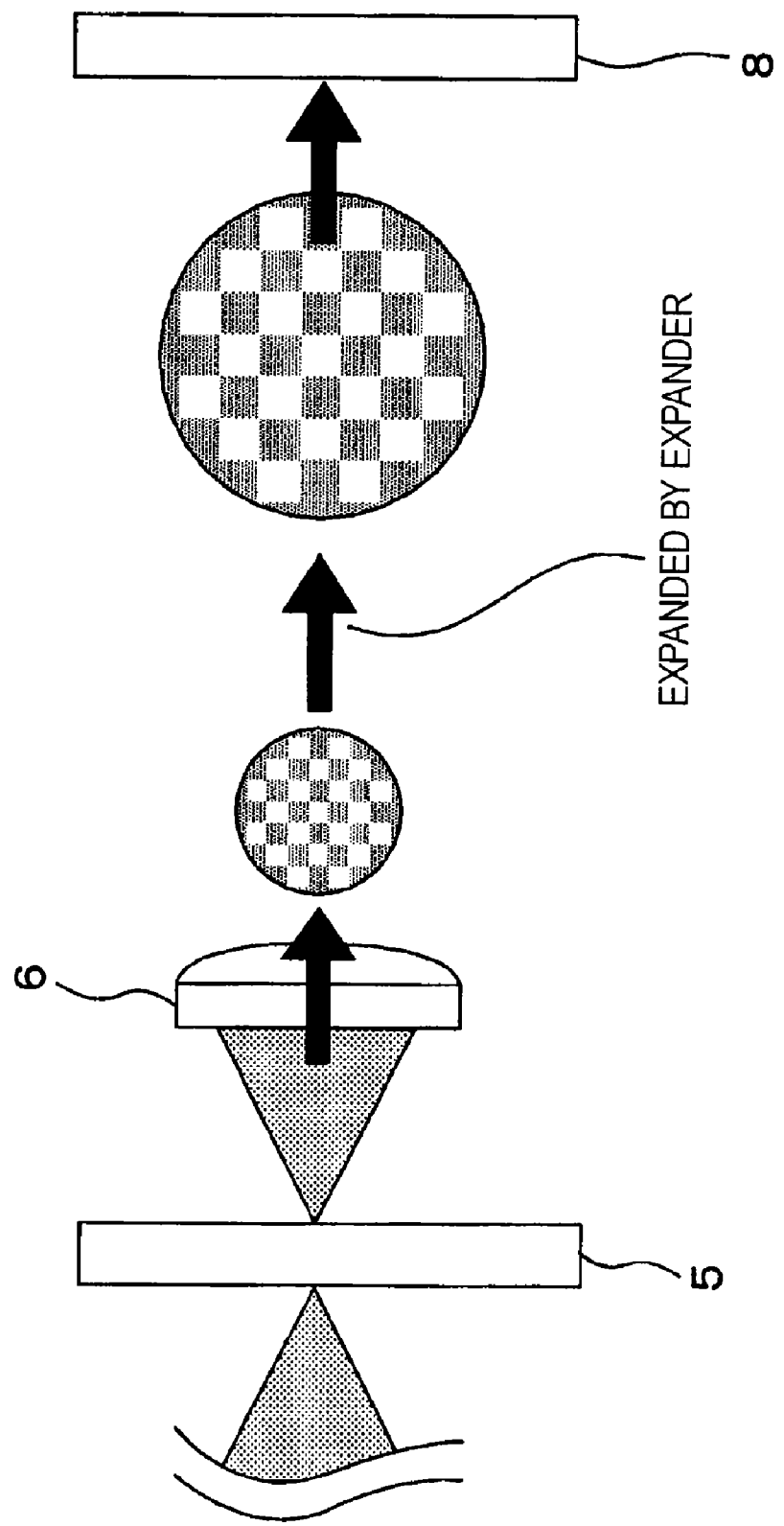
FIG. 4 illustrates an oversampling process.

A reproducing technique using an oversampling process of FIG. 4 is also available.

In the oversampling process, the diffracted light, output from the hologram recording medium 5 and passed through the objective lens 6 as described above, is then expanded through the expander lens 7 and then focused on the image sensor 8 shown in FIG. 1. More specifically, in the oversampling process, an image of 1 bit contained in the diffracted light is detected using a plurality of pixels on the image sensor 8, and data of 1 bit is reproduced based on the average of detected values.

In the hologram recording and reproducing method, the following factors greatly affect signal quality during recording and reproducing operations, thereby constantly adversely affecting SNR and error rate:

a) pixel defect on the SLM, b) pixel defect on the image sensor, and c) image defect originated in the optical system.

With reference to FIG. 5 through FIGS. 8A and 8B, effects of these factors on the signal quality are described below.

Figure 5:
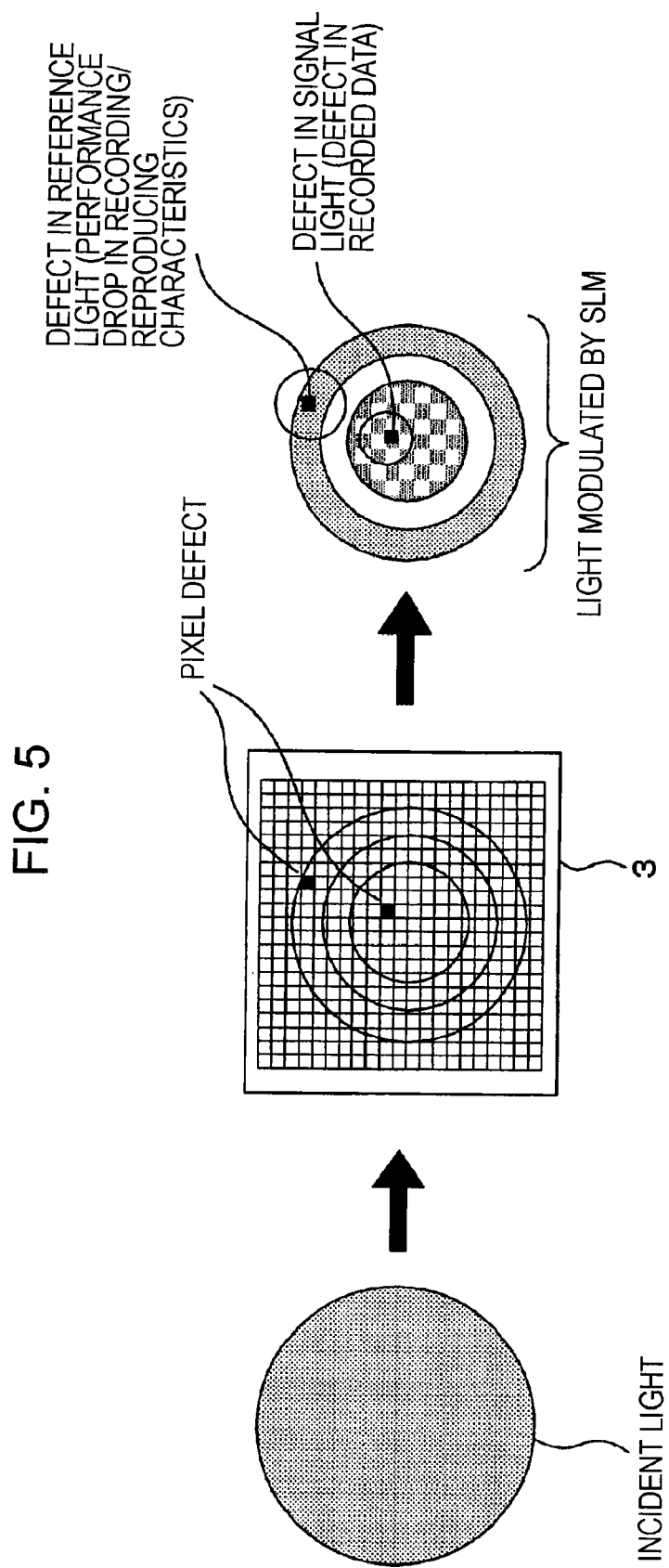
FIG. 5 illustrates an effect of an image defect of a spatial light modulator (SLM)

The effect of a) the pixel defect on the SLM is described with reference to FIG. 5. FIG. 5 diagrammatically illustrates the pixel defect occurring on the SLM 3, light incident on the SLM 3, and light obtained through the modulation process of the SLM 3.

A pixel defect might occur in a pixel on the SLM 3 as shown in FIG. 5. If the defective pixel is located within an irradiation area of the signal light during the recording operation, the pixel defect becomes a defect in the signal light. This defect causes recorded data to be missing.

If the defective pixel is located within an irradiation area of the reference signal during the recording operation, no recorded data missing takes place, but recording characteristics can be still adversely affected.

In accordance with the present embodiment, during the reproducing operation, the reference light is directed to the hologram recording medium 5 through the same optical path as the one used during the recording operation illustrated in FIG. 3. If the defective pixel is located in the reference light portion, reproducing characteristics can also be degraded.

The pixel defect in the reference light does not so directly lead to the missing of a recording and reproducing bit as the pixel defect in the signal light, and disperse defects as few as several pixel defects are not considered in the following discussion.

Figure 6:
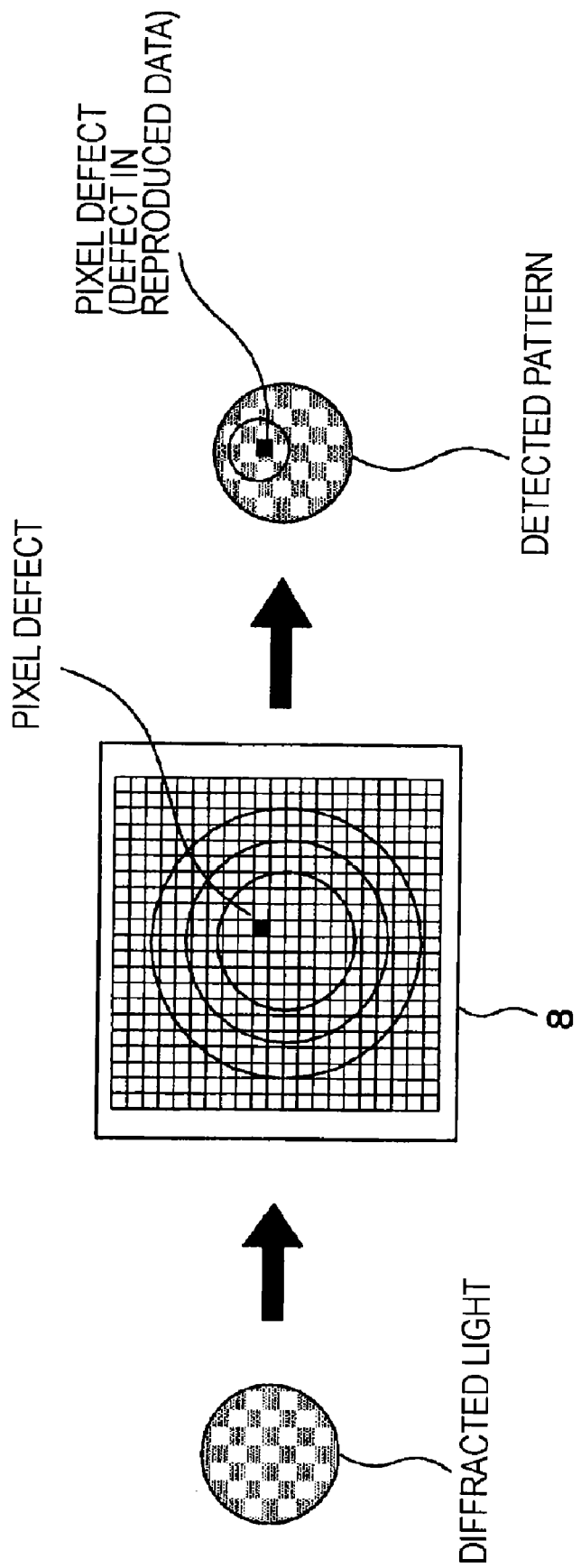
FIG. 6 illustrates an effect of an image defect of an image sensor.

FIG. 6 illustrates the effect of b) the pixel defect on the image sensor. More specifically, FIG. 6 illustrates the diffracted light from the hologram recording medium 5, a pixel defect on the image sensor 8, and a detected pattern obtained by the image sensor 8.

The pixel defect on the image sensor 8 falling within the focusing area of the diffracted light as shown in FIG. 6 leads to data missing during the reproducing operation.

The oversampling process discussed with reference to FIG. 4 to be performed during the reproducing operation are described later.

Figure 7:
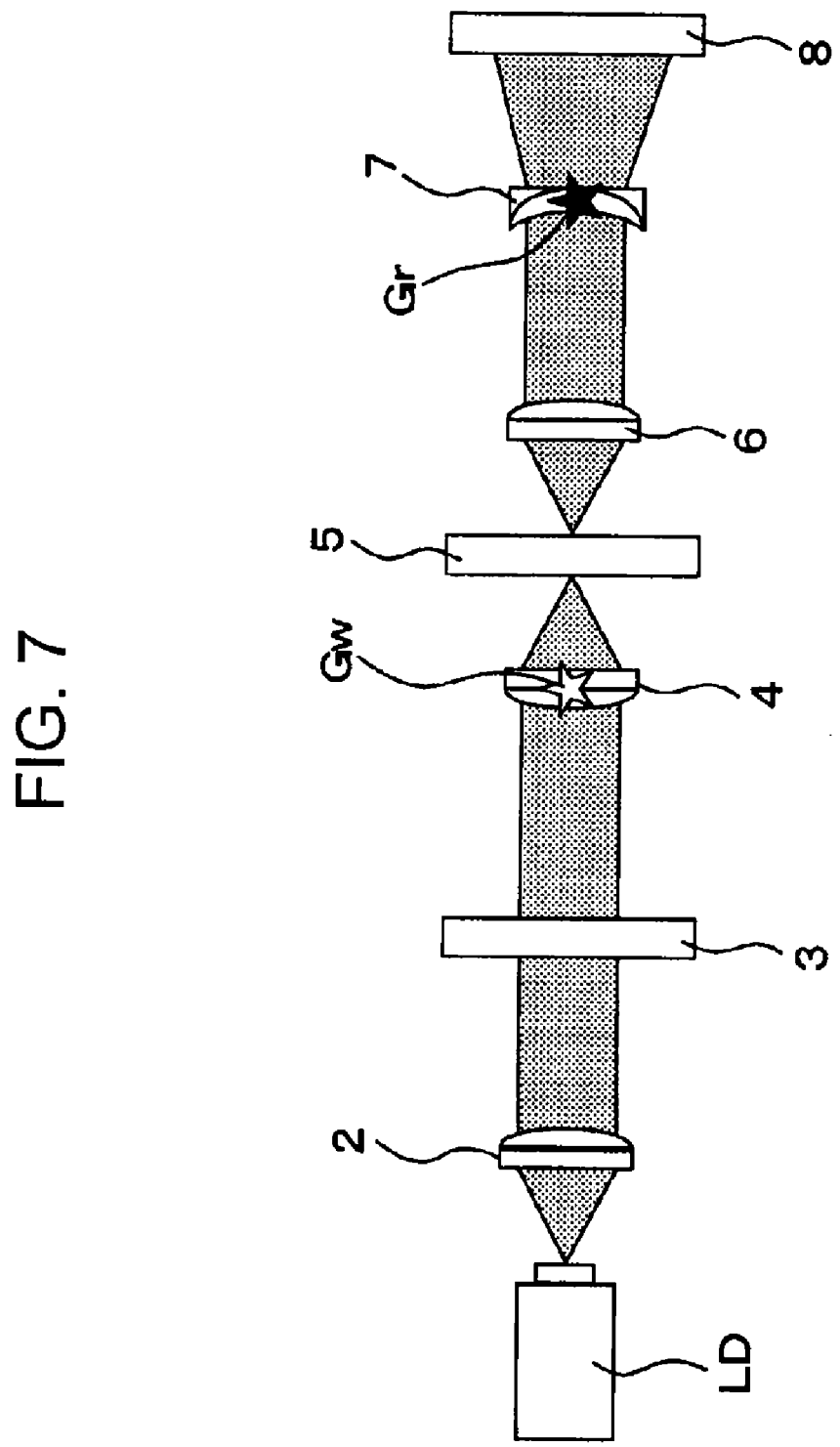
FIG. 7 illustrates an optical system of FIG. 1 in view of an effect of an image defect of an optical system.

FIG. 7 illustrates the optical system of FIG. 1 to discuss further the effect of 3) the image defect originated in the optical system.

The image defect originated in the optical system includes an image missing due to dust sticking. The effect of the image defect may be different depending on where dust sticks, i.e., where a missing image takes place.

For example, if an image is partly missing due to dust sticking to the objective lens 4 as represented by Gw, the signal light modulated by the SLM 3 can be affected. More specifically, if the dust causes an image defect on the objective lens 4 at a location marked by a solid square symbol in FIG. 8A, a defect occurs in the signal light subsequent to the modulation process of the SLM 3. The defect leads to a drop in contrast of the signal light or data missing during the recording operation, and the recorded data can be partly missing.

The missing of the recorded data is identical to the case of a) the pixel defect on the SLM.

Figures 8A, 8B:
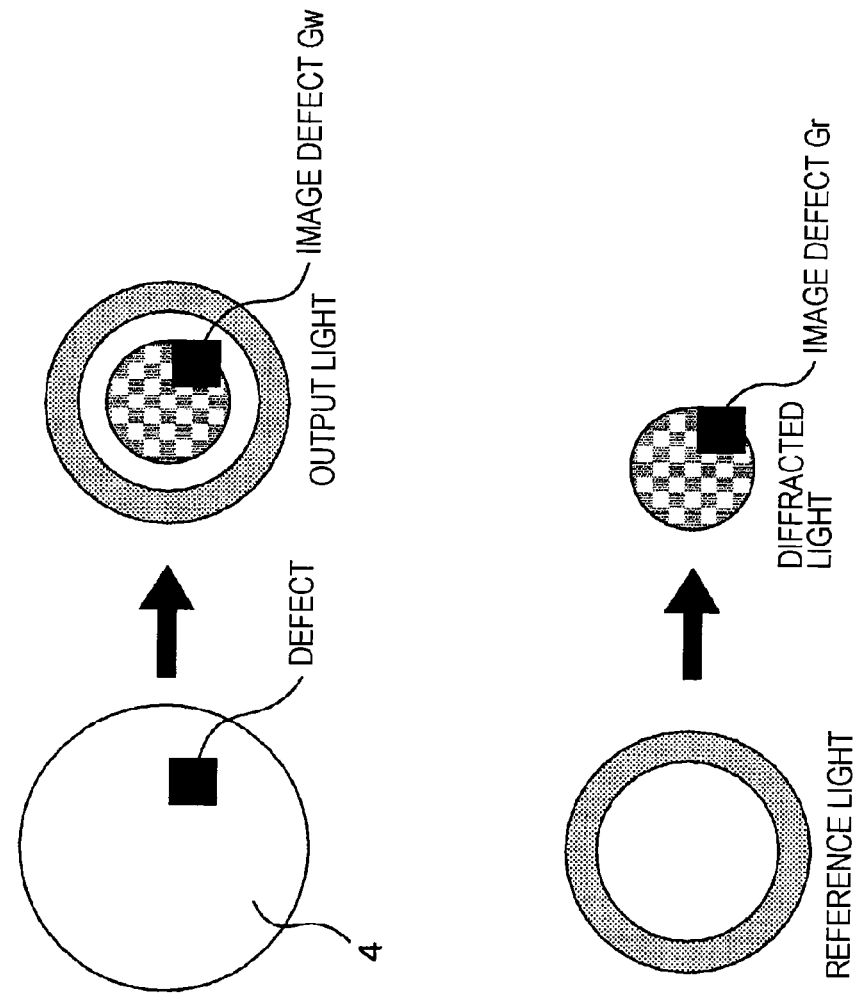
FIGS. 8A and 8B illustrate an adverse effect of an image defect on signal light in the optical system.
Figure 9A:
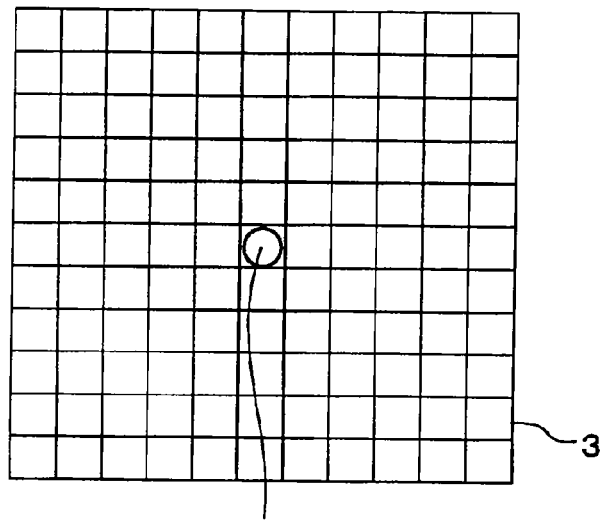
FIGS. 9A-9D separately illustrate a pixel defect on the SLM, an image defect on a recording side, an image defect on a reproducing side, and a pixel defect on the image sensor, occurring in a collinear optical axis.
Figure 9B:
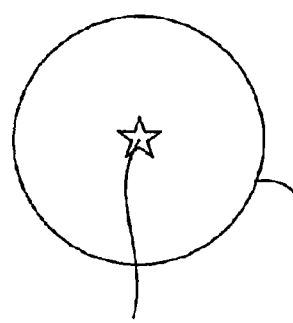
Figure 9C:
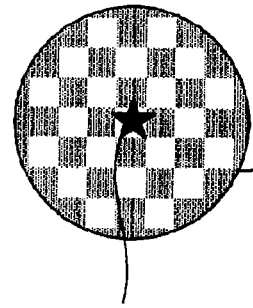
Figure 9D:
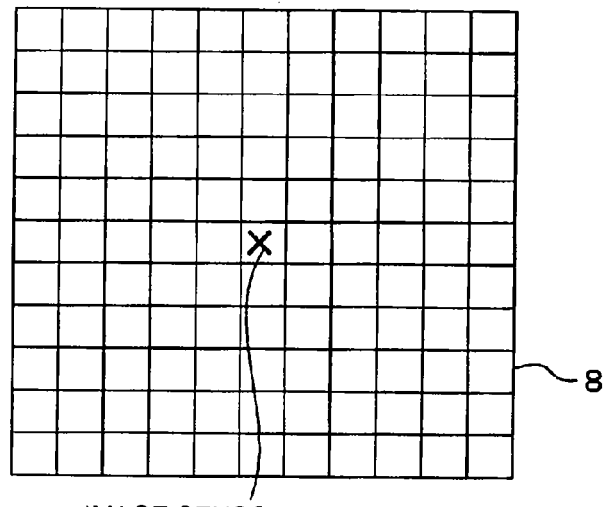

On the other hand, if an image defect occurs due to dust sticking to the expander lens 7 as represented Gr in FIG. 7, the signal light can be adversely affected during the reproducing operation. For example, the image defect might be caused on the expander lens 7 by dust at a location marked by a solid square symbol as shown in FIG. 8B. Although the reference light directed to the hologram recording medium 5 is free from the effect of the dust, but the signal light as the diffracted light suffers from a drop in the contrast thereof or from data missing. The reproduced data is thus partly missing.

The missing of the data is identical to b) the pixel defect on the image sensor.

The recorded data and the reproduced data can thus be missing due to the factors a) through c). As previously discussed, these factors may lead to the persistent degradation in the SNR and error rate. It is necessary to detect the presence or absence of defects due to these factors and reduce the persistent factors degrading the SNR and error factor (i.e., degrading signal quality).

The hologram recording medium 5 is a removable recording medium, and it is important to determine whether a defect occurs on the recording side or the reproducing side.

One of a) pixel defect on the SLM and an image defect represented by Gw, namely, c) image defect originated in the optical system, equivalent to the SLM pixel defect, might occur as a defect on the recording side. With no defect on the reproducing side, the reproducing operation is normally performed from the hologram recording medium 5 if a recording and reproducing apparatus having a normally operating optical system has recorded data thereon.

One of b) pixel defect on the image sensor, and an image defect represented by Gr, namely, c) image defect originated in the optical system, equivalent to a pixel defect on the image sensor might occur as a defect on the reproducing side. With the recording side normally operating, data can be normally recorded onto the hologram recording medium 5, and then be reproduced on a recording and reproducing apparatus having a normally operating reproducing optical system.

Both the recording side and the reproducing side might suffer from defects. In such a case, both the recording operation and the reproducing operation may be restricted.

Solution to a defect may be different depending on whether the defect occurs on the recording side, the reproducing side, or on both sides. From this point of view, it is next important to determine whether the defect occurs on the recording side, the reproducing side, or on both sides.

If a pixel having a defect is identified, that pixel may be excluded from use. For example, a pixel determined to be defective is left unused during the recording operation, and a value to be recorded onto the location of the defective pixel may be recorded using another normal pixel (substitute pixel), and information mapping the defective pixel to the substitute pixel (mapping information) may be recorded onto the hologram recording medium 5. During the reproducing operation, the value of the defective pixel is read from the location of the substitute pixel in accordance with the mapping information recorded on the hologram recording medium 5. The data reproducing operation is thus normally performed.

On the other hand, a defect might occur on the reproducing side. If the reproducing operation is performed without using the defective pixel, the reproduced data at the location of the defective pixel may be missing. If the data is reproduced using the oversampling process, data for one pixel in the recording operation is read using a plurality of pixels on the image sensor 8. Data can thus be read using other pixels without the need for reading data from one pixel. The solution of leaving a defective pixel unused thus works. More specifically, the oversampling process is performed without using the defective pixel. A value of one pixel is detected by averaging detected values of a plurality of pixels in one oversampling pixel block. In this case, the number of defective pixels is subtracted from the overall number of pixels in one oversampling block and the resulting difference is used to average the sum of detected values of the pixels. In this way, the value of one pixel is detected more accurately than an averaging operation accounting for an incorrect value from the defective pixel together with normal pixels.

When a defect occurs on the recording side only, or when the oversampling operation is performed during the reproducing operation, the solution of leaving the defective pixel unused effectively prevents the signal quality from being degraded.

Without determining whether the defect is present on the recording side or the reproducing side, the solution to the defect for the recording operation and the reproducing operation cannot be appropriately adopted. It is thus important to identify the mode of defect creation, i.e., to determine whether the defect occurs on the recording side, the reproducing side, or on both sides.

The mode of defect creation is difficult to identify if a defective pixel on the SLM 3 is collinearly superimposed with a defective pixel on the image sensor 8, or if the defective pixel on the SLM 3 is collinearly superimposed with an image defect represented by Gr in FIG. 7.

Figure 10:
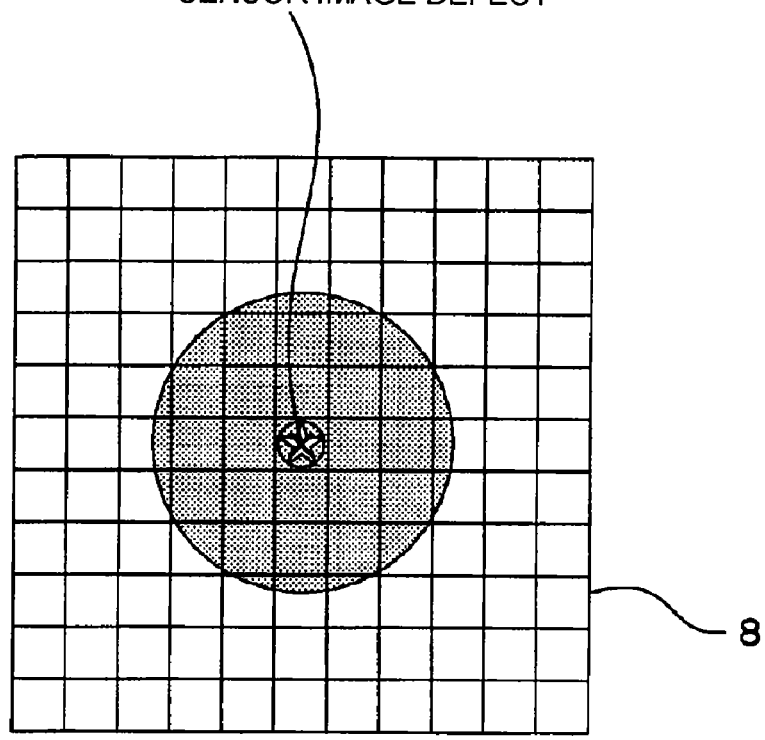
FIG. 10 illustrates an image into which the pixel defect on the SLM, the image defect on the recording side, the image defect on the reproducing side, and the pixel defect on the image sensor, occurring in a collinear optical basis, are superimposed.

FIGS. 9A, 9B, 9C, and 9D respectively illustrate a pixel defect on the SLM 3, an image defect Gw on the recording side (due to dust sticking to the objective lens 4, for example), an image defect Gr on the reproducing side (due to dust sticking to the expander lens 7, for example), and an pixel defect on the image sensor 8, all collinearly overlapping with each other. As shown in FIG. 10, the collinearly occurring defects appear at the same location if finally viewed from the image sensor 8.

The presence or absence of the defects is determined based on the detected values on the image sensor 8. If the defects are overlapped at one point, the arrangement of FIG. 1 uses the same pixel on the image sensor 8 for the defects. The defects thus cannot be sorted.

To overcome the above-described drawback, the recording and reproducing apparatus working with the hologram recording medium 5 includes a first function to determine the presence or absence of a defect. The recording and reproducing apparatus then includes a second function to sort the type of defect if the defect is found.

Figure 11:
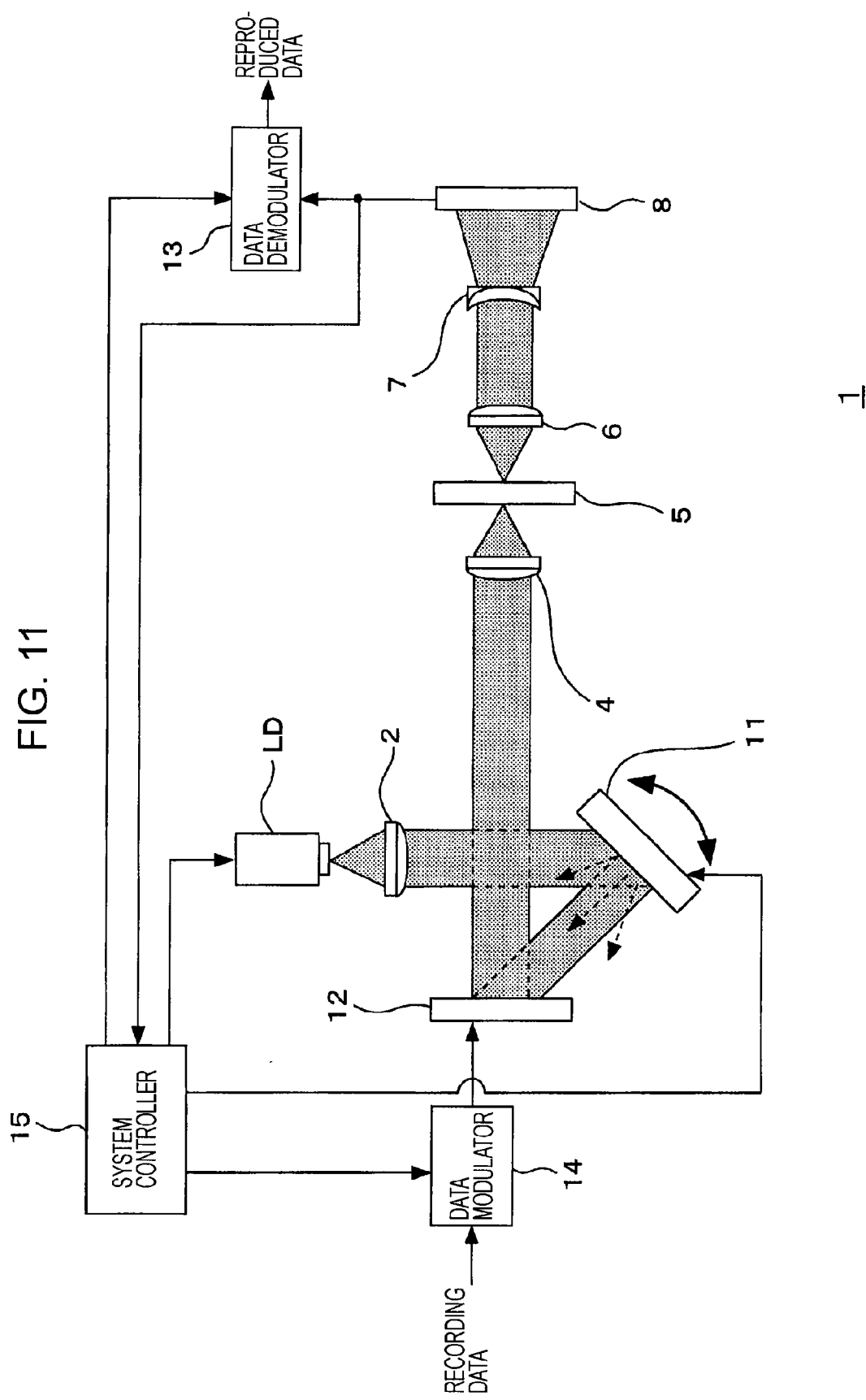
FIG. 11 illustrates a recording and reproducing apparatus in accordance with one embodiment.

FIG. 11 is a block diagram of a recording and reproducing apparatus 1 incorporating the first and second function in accordance with one embodiment. In FIG. 11, elements identical to those described with reference to FIG. 1 are designated with the same reference numerals and the discussion thereof is omitted herein.

In the recording and reproducing apparatus 1, collimated light from the collimator lens 2 is reflected from a tilt mirror 11 and then guided to an SLM 12 as shown. The tilt angle of the tilt mirror 11 is controlled by a controller 15 to be discussed later.

Unlike the previously discussed SLM 3, the SLM 12 is a reflective-type spatial light modulator. Employed as the reflective-type 12 is one of a digital micro mirror device (DMD) or a reflective-type liquid-crystal panel. Each pixel of the SLM 12 reflects incident light to an objective lens 4 in accordance with modulation of bit 1. More specifically, in accordance with the modulation of bit 1, the incident light is guided to the objective lens 4, and light intensity at the pixel that performs the modulation of bit 1 becomes high.

On the other hand, the incident light is not reflected to the objective lens 4 in accordance with modulation of bit 0. Light intensity at a pixel of the bit 0 becomes low (including light blocked).

Light incident on the objective lens 4 from the SLM 12 is converged on a hologram recording medium 5 set at a predetermined position. The optical system on the reproducing side remains identical in structure to that of the recording and reproducing apparatus 50 and the discussion thereof is omitted here.

The value (electrical signal) of each pixel obtained on the image sensor 8 is supplied to a data demodulator 13 as shown in FIG. 11. The data demodulator 13 binarizes the value of each pixel from the image sensor 8, thereby acquiring data composed of bit 1 and bit 0. A predetermined demodulation process is performed on the data, thereby resulting in reproduced data. Bit 1 means light reception (with high light intensity) and bit 0 means light non-reception (with low light intensity).

When the oversampling process is performed, each oversampling pixel block is set up on the pixels on the image sensor 8. The data demodulator 13 sums detected values of the pixels on a per oversampling pixel block basis, averages the sum by the overall number of pixels forming the oversampling pixel block, and detects the value of 1 bit.

In accordance with the present embodiment, the value of each pixel of the image sensor 8 is also supplied via a branch path to the controller 15.

During the recording operation to the hologram recording medium 5, a data modulator 14 modulates input recording data, thereby resulting in a signal light pattern responsive to the recording data, and modulated data for use in generating a reference light as shown in FIG. 2. In response to the modulated data, the pixels of the SLM 12 are driven.

During the reproducing operation, the modulated data is generated to generate the reference light only as shown in FIG. 3, and the pixels of the SLM 12 are driven in accordance with the modulated data.

The controller 15 is a microcomputer including a central processing unit (CPU), a read-only memory (ROM), a random-access memory (RAM), etc., and generally controls the recording and reproducing apparatus 1.

For example, the controller 15 issues to the data modulator 14 an instruction to switch the operation mode of the hologram recording medium 5 between the recording operation and the reproducing operation. During the recording operation, the controller 15 issues an instruction to switch the operation mode, thereby causing the data modulator 14 to perform a modulation process to generate a signal light responsive to the recording data and a reference light. During the reproducing operation, the controller 15 issues an instruction to switch the operation mode, thereby causing the data modulator 14 to perform the modulation process to generate the reference light only.

When the oversampling process is performed during the reproducing operation, the controller 15 issues an oversampling instruction to the data demodulator 13, thereby causing the data demodulator 13 to reproduce data for the oversampling process. During the oversampling process, the controller 15 also controls the expander lens 7, but a driver for driving the expander lens 7 and a control line connected to the driver are not shown herein.

The controller 15 also controls the laser diode LD for on/off operation.

In accordance with an embodiment, a function to determine the presence or absence of the defect and a function to sort the defect are performed as will be described later with reference to flowcharts of FIGS. 16-21.

In the recording and reproducing apparatus 1, the laser light is directed and the SLM 12 performs the intensity modulation in a mode different from the standard recording/reproducing operation in order to determine defects.

To determine the presence or absence of a defect, all pixels of the SLM 12 are set to have bit 1 (for high light intensity) and bit 0 (for low light intensity) with the laser diode LD on. In each of cases that all pixels are modulated with bit 1 and that all pixels are modulated with bit 0, the defect determination is performed based on the detected values obtained on the pixels on the image sensor 8.

It should be noted that light modulated for defect detection (with all pixel at bit 1 or bit 0) are simply passed through the hologram recording medium 5 and then directed to the image sensor 8. The hologram recording medium 5 for use in defect detection is not necessarily a medium having recording and reproduction capability, but instead merely a medium having identical refraction index (transmittance).

As described above, the defect determination is performed based on the detected values of the pixels on the image sensor 8. To perform reliably the defect determination, the pixels on the image sensor 8 preferably output sufficient and reliable detected values. To this end, preferably, a medium made of a material having a transmittance higher than that of the hologram recording medium 5 for the standard recording/reproduction operation is preferably used.

Depending on the way dust sticks, the resulting defect may simply cause a mere drop in contrast, and does not lead to data missing. When the defect determination is performed in the present embodiment, the detected values of the pixels on the image sensor 8 are determined concerning bit 1 and bit 0 according to a predetermined threshold value.

The presence or absence of defects is determined based on the detected values obtained at the pixels on the image sensor 8 with all the pixels on the SLM 12 set to be to bit 1 or bit 0. To simplify the determination process on the recording and reproducing apparatus 1, a specific defect creation pattern of the pixel defect on the SLM 12 and the pixel defect on the image sensor 8 is defined as described below.

The pixel defect on the SLM 12 is defined as a state in which the laser light cannot be modulated with a pixel on the SLM 12 fixed to bit 1 or bit 0 even if intensity modulation is attempted. More specifically, there are two cases, in one case that the value of bit 0 results on the image sensor 8 in response to bit 1 modulation on the SLM 12 and in the other case that the value of bit 1 results on the image sensor 8 in response to bit 0 modulation on the SLM 12.

The pixel defect on the image sensor 8 is defined as a state in which the value of bit 0 results because of a circuit failure or the like in response to the incident light, or the value from a pixel swings to a maximum side (to bit 1 side) because of a circuit failure or the like even with no incident light applied, or the value of bit 1 always results due to an output offset failure.

More specifically, only two types of defects occur. A first type of defect occurs when the image sensor 8 results in bit 0 in response to the bit 1 modulation of the SLM 12 and a second type of defect occurs when the image sensor 8 results in bit 1 in response to the bit 0 modulation of the SLM 12.

Theoretically, the SLM 12 can modulate the incident light with bit 0 and bit 1 regardless of the originally intended bit 1 and bit 0, and the image sensor 8 can provide the output thereof in the opposite form. The present embodiment does not consider such defects as unlikely defects.

Based on the above definition of the defects, the presence or absence of the defects is determined based on the detected values from the pixels on the image sensor 8 when all the pixels on the SLM 12 modulates the incident light with bit 1 or bit 0 with the laser diode LD remaining switched on.

If the detected value of each pixel on the image sensor 8 is bit 1 or bit 0 with all the pixels on the SLM 12 set to be at bit 1 or bit 0, the apparatus functions normally with no defects occurring. In other words, if the detected value at each pixel on the image sensor 8 is not bit 1 or not bit 0 with all pixels on the SLM 12 set to bit 1 or bit 0, a defect may occur.

The first function to determine the presence or absence or absence of defects is performed by determining whether the detected value at each pixel on the image sensor 8 is either bit 1 or bit 0 when all pixels on the SLM 12 modulates the incident light with bit 1 or bit 0 with the laser diode LD switched on.

If a defect is found in the first determination function, the mode of defect is identified. As previously discussed, the defect is determined to be on the recording side, the reproducing side, or on both sides.

Before discussing the specific operation for identifying the defect creation mode, the patterns of the detected values obtained from the pixels on the image sensor 8 are discussed with reference to FIG. 12B. As for the previously defined pixel defects on the SLM 12 and on the image sensor 8, the detected value patterns are obtained with three cases, namely, with all pixels set to bit 1 or bit 0 with the laser diode LD switched on, and with the laser diode LD switched off.

FIG. 12A illustrates a positional relationship of the SLM 12, the hologram recording medium 5, the image sensor 8, the image defect Gw on the recording side and the image defect Gr on the reproducing side, and types of pixel defects occurring on the SLM 12 and the image sensor 8 (as parenthesized).

FIG. 12A shows a defect occurring due to dust sticking to the objective lens 4 as the image defect Gw on the recording side. Dust sticking to the collimator lens 2 or the tilt mirror 11 can also be a defect as the image defect Gw on the recording side in the recording and reproducing apparatus 1.

Also, FIG. 12A shows a defect occurring due to dust sticking to the expander lens 7 as the image defect Gr on the reproducing side. Dust sticking to the objective lens 6 can also be a defect.

For convenience of explanation, the image defect on the recording side is caused by dust sticking to the objective lens 4 as shown in FIG. 12A. The image defect on the reproducing side is also caused by dust sticking to the expander lens 7 as shown in FIG. 12A.

FIG. 12B shows the three cases, namely, the laser diode LD is switched on with all pixels set to bit 1 or bit 0, and the laser diode LD is switched off (bit 1/bit 0/LDOFF). Patterns of the detected values of each pixel on the image sensor 8 (hereinafter referred to as detected value patterns) are only four, namely, (1,0,0), (1,1,0), (1,1,1), and (0,0,0).

The detected value pattern (1,0,0) is a pattern free from defects. As previously discussed, if no defects occur (i.e., both the SLM 12 and the image sensor 8 are free from detects, and neither the image defect Gw on the recording side nor the image defect Gr on the reproducing side is present), the image sensor 8 provides a detected value of bit 1 in response to the modulation of bit 1 on the SLM 12 and the image sensor 8 provides a detected value of bit 0 in response to the modulation of bit 0 on the SLM 12. If the laser diode LD is switched off, the image sensor 8 provides a detected value of bit 0 representing no light reception (in low light intensity).

As previously discussed, in the first function to determine the presence or absence of defect, the defect determination is performed based on only the detected values of the image sensor 8 in response to the bit 1 and bit 0 modulation on the SLM 12 with the laser diode LD switched on. In this way, the determination of the presence or absence of defects is performed without referencing the detected values with the laser diode LD switched off. When the detected values are (1,0) obtained in response to the bit 1 and bit 0 modulation in FIG. 12B, the detected value pattern containing a detected value with the laser diode LD switched off can be only (1,0,0) indicating absence of defects.

As shown in FIG. 12B, each of the detected value patterns (1,1,0), (1,1,1), (0,0,0) below the pattern (1,0,0) indicating the absence of defects means that at least one of the pixel defect on the SLM 12, the pixel defect on the image sensor 8, the image defect Gw on the recording side, and the image defect Gr on the reproducing side occurs. In other words, the patterns mean that at least one of a defect on the recording side, a defect on the reproducing side, and defects on both sides occurs.

To prove the detected value patterns responsive to the occurring defects are limited to only the three patterns, each of the detected value patterns is analyzed for each mode of defect (a defect on the recording side, a defect on the reproducing side, and defects on both sides).

The defect on the recording side is analyzed first. The defects occurring on the recording side include the pixel defect on the SLM 12 and/or the image defect Gw on the recording side.

If the defects on the recording side include only the pixel defect on the SLM 12, that defect is likely to be the one fixed to bit 1 or bit 0. If the SLM 12 is fixed to bit 1, the detected values on the image sensor 8 becomes bit 1 in response to the bit 1 modulation on the SLM 12, bit 1 in response to the bit 0 modulation on the SLM 12, and bit 0 with the laser diode LD off. The detected value pattern is thus (1,1,0). If the SLM 12 is fixed to bit 0, the detected values on the image sensor 8 becomes bit 0 in response to the bit 1 modulation on the SLM 12, bit 0 in response to the bit 0 modulation on the SLM 12, and bit 0 with the laser diode LD off. The detected value pattern is thus (0,0,0).

If the defects on the recording side are only the image defect Gw, the detected value on the image sensor 8 is always bit 0 with the laser diode LD on regardless of the modulation on the SLM 12. When the laser diode LD is switched off, the detected value on the image sensor 8 is bit 0. More specifically, if the defects on the recording side are only an image defect, the detected value pattern of the image sensor 8 is (0,0,0).

If the defects on the recording side includes the pixel defect on the SLM 12 and the image defect Gw, the detected value pattern of the image sensor 8 is (0,0,0) regardless of whether the SLM 12 is fixed to bit 1 or bit 0.

From the foregoing discussion, if the defects are present on the recording side only, the detected value pattern of the image sensor 8 is one of the two patterns only, namely (1,1,0) or (0,0,0).

The defects on the reproducing side are the pixel defect on the image sensor 8 and/or the image defect Gr on the reproducing side.

If the defect occurs on the image sensor 8 only as the defect on the reproducing side, that defect is likely to be the one fixed to bit 1 or bit 0. If the image sensor 8 is fixed to bit 1, the detected value on the image sensor 8 is naturally bit 1 regardless of whether the SLM 12 modulates the incident light with bit 1 or bit 0. Since the detected value on the image sensor 8 is bit 1 even with the laser diode LD off, the detected value pattern is (1,1,1). Similarly, if the image sensor 8 is fixed to bit 0, the result becomes (0,0,0).

If the defects on the reproducing side are only the image defect Gr, the detected value on the image sensor 8 is bit 0 with the laser diode LD on regardless of whether the SLM 12 modulates the incident light with bit 1 or bit 0. When the laser diode LD is switched off, the detected value on the image sensor 8 is bit 0. More specifically, if the defects on the reproducing side include only the image defect Gr, the detected value pattern of the image sensor 8 is (0,0,0).

The defects on the reproducing side might include the pixel defect on the image sensor 8 and the image defect Gr. In such a case, the detected value pattern matches the defect content of the image sensor 8. More specifically, the detected value pattern is (1,1,1) with the image sensor 8 fixed to bit 1, and detected value pattern is (0,0,0) with the image sensor 8 fixed to bit 0.

If the defects occur on the reproducing side only, the detected value pattern of the image sensor 8 is one of the two patterns only, namely, (1,1,1) or (0,0,0).

When the defects occur on both the recording side and the reproducing side, the defect creation patterns may be divided into one case with image defect (Gw and/or Gr) and the other case without image defect.

If the image defect is only the image defect Gw on the recording side, two cases are considered. The defects on both the recording side and the reproducing side include "the image defect Gw on the recording side+the pixel defect on the image sensor 8" in one case, or "the image defect Gw on the recording side+the pixel defect on the SLM 12+the pixel defect on the image sensor 8" in the other case. More specifically, if the image sensor 8 is fixed to bit 1, the detected value pattern is (1,1,1), and if the image sensor 8 is fixed to bit 0, the detected value pattern is (0,0,0).

If the image defect is only the image defect Gr on the reproducing side, the defects on both the recording side and the reproducing side include "the image defect Gr on the reproducing side+the pixel defect on the SLM 12" in one case or "the image defect Gr on the reproducing side+the pixel defect on the SLM 12+the pixel defect on the image sensor 8" in the other case. In the other case containing the pixel defect on the image sensor 8, the detected value pattern of the image sensor 8 depends on whether the defect content of the image sensor 8 is bit 1 or bit 0. The detected value pattern of the image sensor 8 is thus either (1,1,1) or (0,0,0). In the one case containing the pixel defect on the SLM 12, the detected value pattern of the image sensor 8 is only (0,0,0).

When the defects occur on both the recording side and the reproducing side, the likely cases are four, i.e., "the image defect Gw on the recording side+the image defect Gr on the reproducing side," "the image defect Gw on the recording side+the pixel defect on the SLM 12+the image defect Gr on the reproducing side," "the image defect Gw on the recording side+the image defect Gr on the reproducing side+the pixel defect on the image sensor 8," and "the image defect Gw on the recording side+the pixel defect on the SLM 12+the image defect Gr on the reproducing side+the pixel defect on the image sensor 8."

In the first case where "the image defect Gw on the recording side+the image defect Gr on the reproducing side" are present, the detected value pattern of the image sensor 8 is only (0,0,0). In the second case where "the image defect Gw on the recording side+the pixel defect on the SLM 12+the image defect Gr on the reproducing side" are present, the detected value pattern of the image sensor 8 is (0,0,0) regardless of the content of the pixel defect on the SLM 12. In the third and fourth cases where the pixel defect on the image sensor 8 is contained, the detected value pattern of the image sensor 8 is either (1,1,1) or (0,0,0).

When the defects occur on both the recording side and the reproducing side, the combination of the defects is only "the pixel defect on the SLM 12+the pixel defect on the image sensor 8" as long as no image defect occurs. The detected value pattern of the image sensor 8 is either (1,1,1) or (0,0,0) depending on the defect content of the image sensor 8.

When the defects occur on both the recording side and the reproducing side, the likely detected value pattern is either (1,1,1) or (0,0,0).

If a defect occurs with the three settings with all pixels on the SLM 12 fixed to either bit 1 or bit 0 with the laser diode LD on and with the laser diode LD off, the detected value pattern of the image sensor 8 can be one of (1,1,0), (1,1,1) and (0,0,0).

FIG. 12B lists the types of defects likely to occur in each of the detected value patterns of the image sensor 8.

The detected value pattern (1,1,0) of the detected value patterns of the image sensor 8 is the one occurring when the defect is caused only by the SLM 12 fixed to bit 1.

More specifically, the detected value on the image sensor 8 is reversed between bit 1 and bit 0 with the laser diode LD on and off, and the image sensor 8 is determined to be free from defects. Since the detected value on the image sensor 8 is bit 1 with the laser diode LD on, no image defect is determined to occur. From the foregoing discussion, the likely possibility is only a pixel defect on the SLM 12. In this case, the detected value is bit 1 with the bit 0 modulation, and the defect is thus identified to be in a pixel fixed to bit 1 on the SLM 12.

The detected value pattern (1,1,0) thus identifies the defect caused by the SLM 12 fixed to bit 1 (i.e., the defect on the recording side only).

The detected value patterns (1,1,1) and (0,0,0) result from one of the defect on the recording side only, the defect on the reproducing side only, and the defect on the recording side+ the defect on the reproducing side. More specifically, if one of these detected value patterns is obtained, it is difficult to determine whether the defect is any one of the defect on the recording side only, the defect on the reproducing side only, and the defect on the recording side and the defect on the reproducing side.

The detected value pattern (1,1,1) shows that the detected value on the image sensor 8 is bit 1 with the laser diode LD off as represented by 1 in a broken circle, and the image sensor 8 is definitely fixed to bit 1. On the other hand, the pixel defect on the image sensor 8 makes it difficult to determine another defect, and there is a possibility that a defect occurs on the recording side. Without examining this possibility, the defect creation mode cannot be identified.

The defect on the recording side, the defect on the reproducing side and the defects on both the recording side and the reproducing side cannot be sorted from each other because a plurality of defects may occur co-linearly in superimposition on a pixel on the image sensor 8 as shown in FIGS. 9A-9D and 10.

In accordance with the present embodiment, the defects likely to be collinearly superimposed (namely, the pixel defect on the SLM 12, the image defect Gw on the recording side, the image defect Gr on the reproducing side and the pixel defect on the image sensor 8) are sorted and then individually determined for presence or absence.

To this end, the recording and reproducing apparatus 1 includes the tilt mirror 11 as shown in FIG. 11.

The tilt mirror 11 of FIG. 11 is tilted from the initial position thereof to tilt the angle of the incident light to the image sensor 8.

Figure 13:
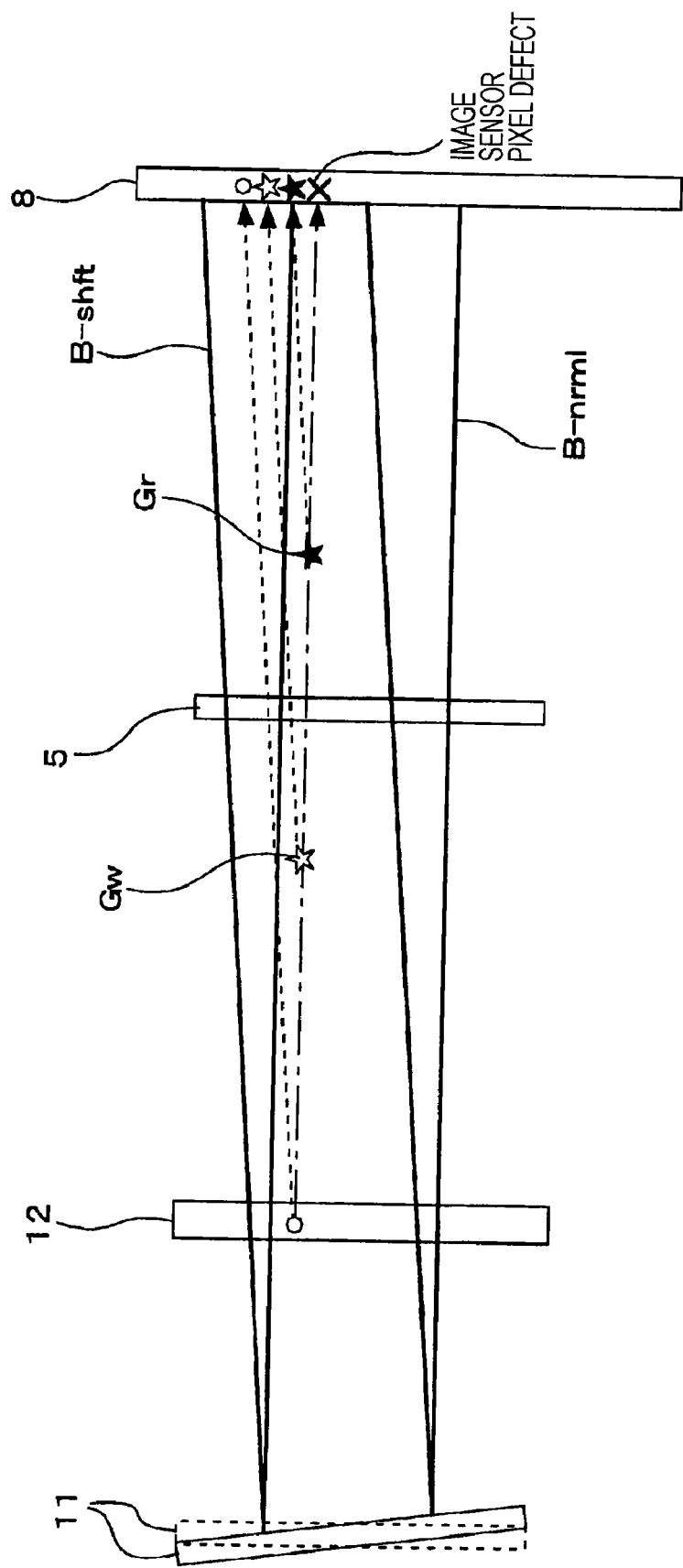
FIG. 13 diagrammatically illustrates a variation in a tilt angle of an optical axis responsive to tilting of a tilt mirror.

FIG. 13 diagrammatically illustrates a variation in the tilt angle of the optical axis with the tilt mirror 11 changing in the tilt angle thereof from the initial position.

FIG. 13 illustrates a relationship of a pixel defect on the SLM 12 (represented by a small blank circle symbol (°)), an image defect Gw on the recording side (represented by a blank star symbol), an image defect Gr on the reproducing side (represented by a solid star symbol), and a pixel defect on the image sensor 8 (represented by the letter X) together with the tilt mirror 11, the SLM 12, the hologram recording medium 5, and the image sensor 8 of FIG. 11. These defects are collinearly superimposed along the same dot-and-dash chain line, and thus occur in the same optical axis. For convenience of explanation, the SLM 12 is a transmissive-type.

As shown in FIG. 13, the tilt mirror 11 is tilted from the initial position thereof (i.e., from the position as represented by broken line, namely, from the installed angle for standard recording and reproducing operations). In response, the laser beam is tilted from laser beam B-nrml at the initial position to laser beam B-shft. The laser beam B-shft is incident on the image sensor 8. As shown in FIG. 13, the image of the pixel defect on the SLM 12, the image of the image defect Gw on the recording side, the image of the image defect Gr on the reproducing side change the incident positions thereof on the image sensor 8. The images shift the incident positions thereof on the image sensor 8 from the incident positions with the laser beam B-nrml at the initial position.

Figure 14:
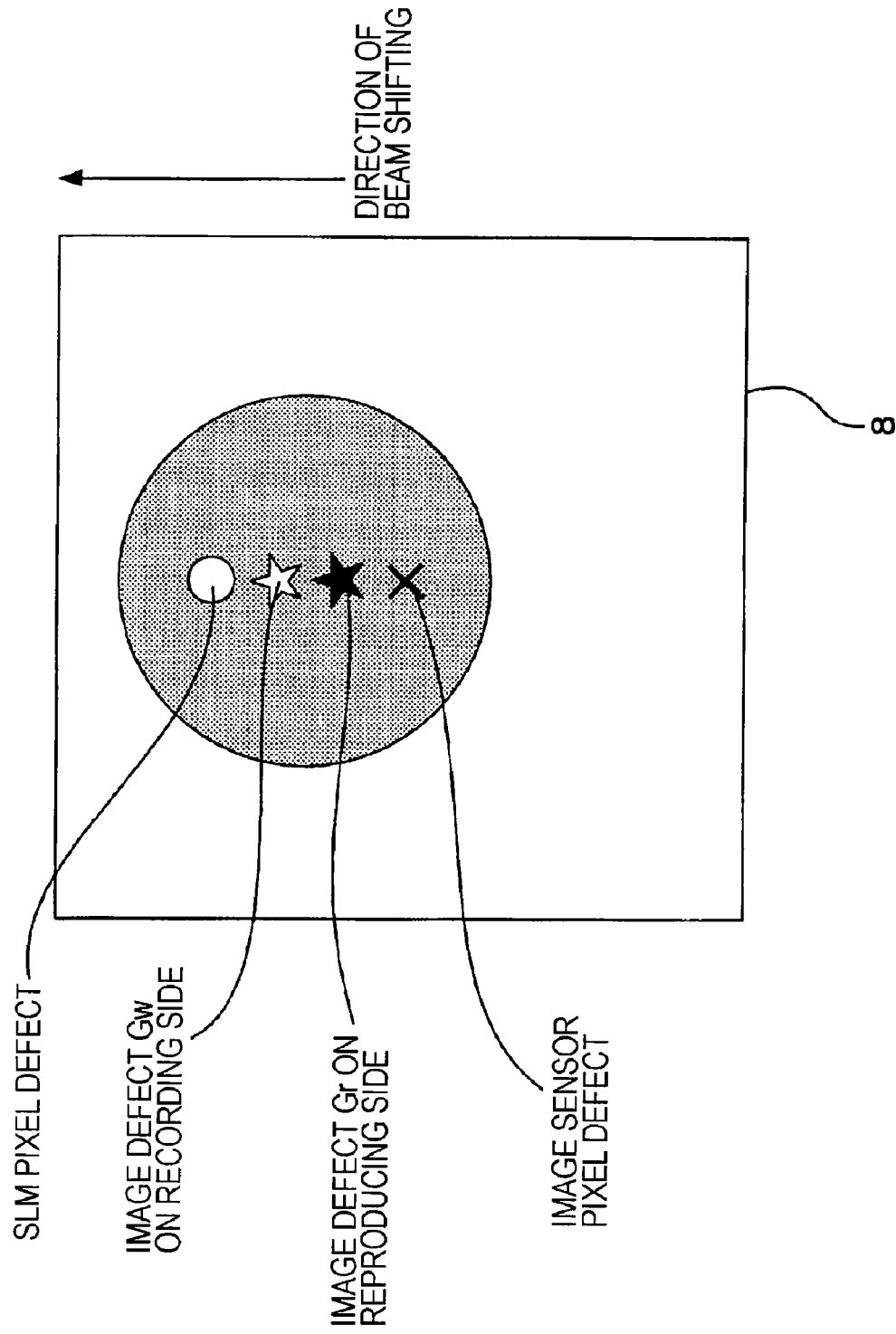
FIG. 14 diagrammatically illustrates the shifting of an image of each defect on the image sensor in response to the tilting of the tilt mirror.

FIG. 14 diagrammatically illustrates the image of the pixel defect on the SLM 12, the image of the image defect Gw on the recording side, and the image of the image defect Gr on the reproducing side, each image shifted with the tilt mirror 11 tilted. When the tilt mirror 11 is tilted from the initial position thereof as shown in FIG. 14, the image of the pixel defect on the SLM 12, the image of the image defect Gw on the recording side, and the image of the image defect Gr on the reproducing side are shifted along the shift direction of the laser beam from the collinearly superimposed positions thereof at the pixel defect on the image sensor 8 with the tilt mirror 11 at the initial position. The image of the pixel defect on the SLM 12, the image of the image defect Gw on the recording side, and the image of the image defect Gr on the reproducing side are thus incident on separate positions on the image sensor 8.

The incident position of each image on the image sensor 8 can be controlled by adjusting the tilt angle of the tilt mirror 11. The positions of the defects, except the image sensor 8, are known to lie in the SLM 12, the objective lens 4 (the image defect Gw on the recording side), and the objective lens 6 (the image defect Gr on the reproducing side). Distances from these elements to the image sensor 8 are known beforehand. Given the distances of the elements to the image sensor 8, an amount of shift of each image on the image sensor 8 can be determined from the tilt angle of the tilt mirror 11.

Figure 15:
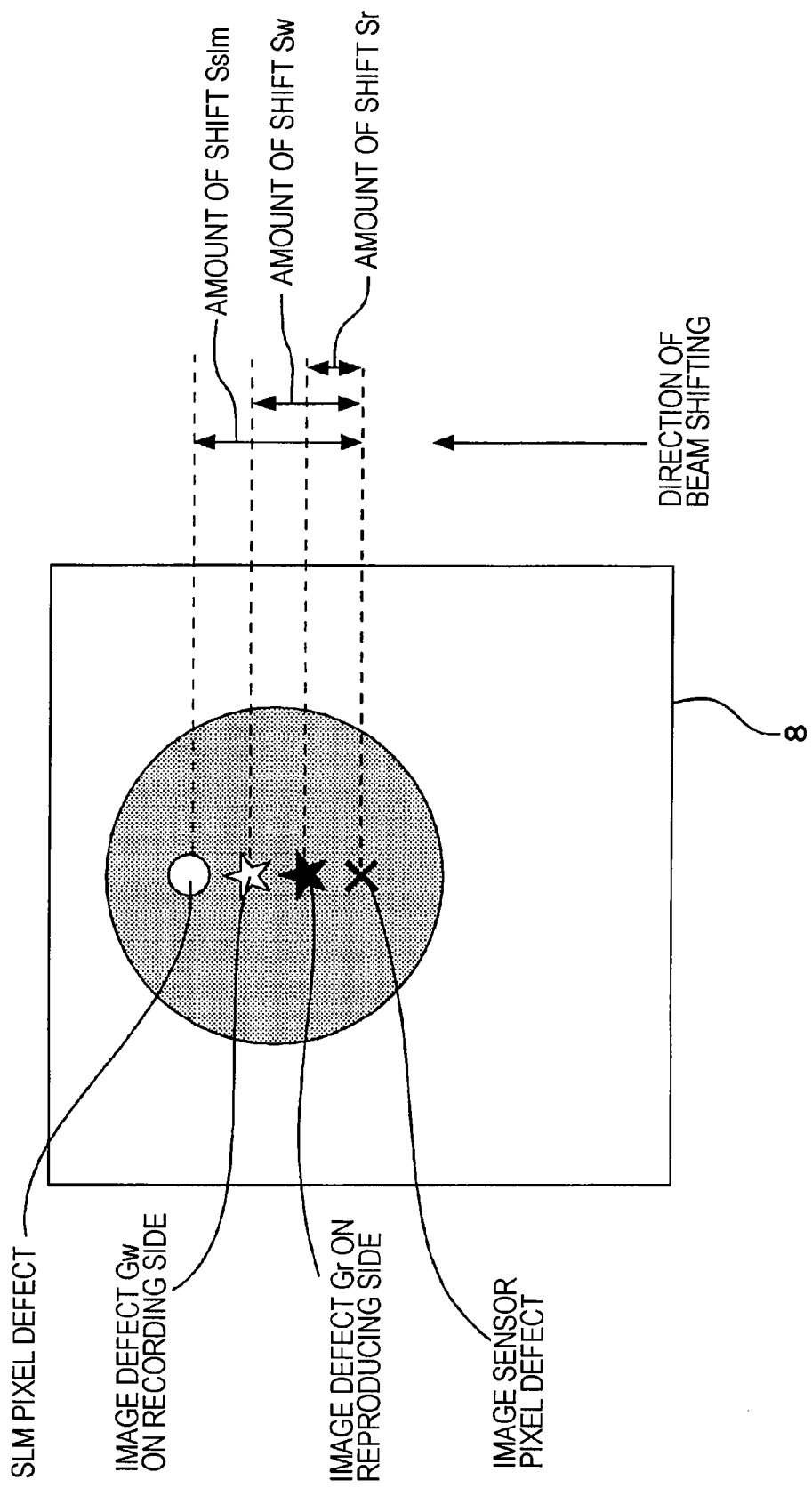
FIG. 15 illustrates an amount of shift of each image on the image sensor in response to a tilt angle of the tilt mirror.

FIG. 15 illustrates a shift amount of each image on the image sensor 8 in response to a given tilt angle of the tilt mirror 11. When the tilt mirror 11 is tilted by an angle, the shift amount of the image of the pixel defect on the SLM 12 is Sslm based on the tilt angle (namely, the tilt angle of the laser beam B-shft) and the distance between the SLM 12 and the image sensor 8. Similarly, the shift amount of the image defect Gw on the recording side is Sw based on the tilt angle of the tilt mirror 11 and the distance between the objective lens 4 and the image sensor 8, and the shift amount of the image defect Gr on the reproducing side is Sr based on the tilt angle of the tilt mirror 11 and the distance between the objective lens 6 and the image sensor 8.

Since the SLM 12 is farthest apart from the image sensor 8, the image of the pixel defect on the SLM 12 shifts most in the shift direction of the laser beam.

The use of the tilt mirror 11 causes the image of the pixel defect on the SLM 12, the image of the image defect Gw on the recording side, and the image of the image defect Gr on the reproducing side, incident on the image sensor 8, to shift in position by shift amounts responsive to the tilt angle.

Even when the image of the pixel defect on the SLM 12, the image of the image defect Gw on the recording side, the image of the image defect Gr on the reproducing side, and the pixel defect on the image sensor 8 occur at collinearly superimposed positions, the images can be located in separate positions on the image sensor 8 by tilting the tilt mirror 11. The defects can thus be discriminated to determine the presence or absence thereof.

The defect determination process of the recording and reproducing apparatus 1 is specifically described below.

In the defect determination process, the first function to determine the presence or absence of the defect is performed. The value of each pixel on the image sensor 8 is detected with all pixels on the SLM 12 set to bit 1 or bit 0 with the laser diode LD switched on.

The presence or absence of a defect is determined based on the detection result. As shown in FIG. 12B, any pixel is determined to be normal if the detected value of that pixel on the image sensor 8 is (1,0) in response to the modulation of bit 1/bit 0, respectively.

When the laser light is modulated with bit 1 with the laser diode LD on, the detected value obtained on the pixel on the image sensor 8 is hereinafter referred to as "Pon-1." The detected value obtained on the pixel on the image sensor 8 with the laser beam modulated with bit 0 is referred to as "Pon-0."

If the detected value is not (1,0), a defect must occur in a pixel on the image sensor 8, or in a pixel on the SLM 12 in a collinear optical axis with that pixel on the image sensor 8, or in a location on the objective lens 4 in a collinear optical axis with that pixel on the image sensor 8, or in a location on the expander lens 7 in a collinear optical axis with that pixel on the image sensor 8.

The values detected in response to the modulation of bit 1 and bit 0 with the laser diode LD on may be (1,1) and (0,0) besides (1,0) (see FIG. 12B).

If the detection result is (1,1), the detected value patterns including the detected value with the laser diode LD off are both (1,1,0) and (1,1,1) only.

With reference to FIG. 12B, the detected value pattern (1,1,0) determines that the likely defect is only the one with the SLM 12 fixed to bit 1. More specifically, the detected value pattern (1,1,0) determines that the defect occurring in a collinear optical axis with a pixel on the image sensor 8 providing the detection result (1,1) is only the pixel defect on the SLM 12, i.e., that the occurring defect is only the defect on the recording side.

If a pixel (namely, a defective pixel D2 to be discussed later) provides the detection result of (1,1) in response to the modulation of bit 1/bit 0, the value of that pixel is re-detected with the laser diode LD off to determine whether that pixel is a pixel of the detected value pattern (1,1,0) or a pixel of the detected value pattern (1,1,1). If the detected value is "0" with the laser diode LD off, the defect occurring in a collinear optical axis with the pixel on the image sensor 8 is determined to be only the pixel defect on the SLM 12.

The value re-detected with the laser diode LD off to determine whether the pixel has the detected value pattern (1,1,0) or (1,1,1) is hereinafter referred to as "Pd2."

The pixel that provides the detection result (1,1) responsive to the modulation of bit 1 and bit 0 and can be one of the detected value patterns (1,1,0) and (1,1,1) is hereinafter referred to as defective pixel D2.

If the re-detection result of the detected value Pd2 is "1," and the detected value pattern is (1,1,1), the defect likely to occur in a collinear optical axis with that pixel can be the defect on the reproducing side or defects on the recording side and the reproducing side. In this case, the tilt mirror 11 is tilted to discriminate the defects, and the images of the defects likely to occur in a collinear optical axis are thus shifted to determine the presence or absence of each defect.

The detected value Pd2 being "1" and falling within the detected value pattern (1,1,1) is referred to as a defective pixel D3.

If the detected value is (0,0) in response to the modulation of bit 1/bit 0, the detected value pattern containing the detected value with the laser diode LD off is (0,0,0) (see FIG. 12B). More accurately, a determination of whether the detected value pattern is (0,0,0) is performed by referencing the detected value responsive to the modulation of bit 1 rather than referencing the detected values responsive to the modulation of bit 1 and bit 0. As shown in FIG. 12B, if the detected value is "0" in response to the modulation of bit 1, the detected value pattern can be only (0,0,0). Only the detected value responsive to the modulation of bit 1 is referenced, and if the detected value is the one responding to bit 0, the pattern of that pixel is (0,0,0).

The detected value pattern (0,0,0) is obtained from the defect on the recording side, the defect on the reproducing side, or defects on both the recording side and the reproducing side. To identify the defect, the tilt mirror 11 is also tilted.

The pixel that provides the detected value "0" in response to the modulation of bit 1 and has the detected value pattern (0,0,0) as shown in FIG. 12B is referred to as a defective pixel D1.

The defective pixel D3 having the detected value pattern (1,1,1) and the defective pixel D1 having the detected value pattern (0,0,0) likely to occur in a collinear optical axis with each other are discriminated from each other and the presence or absence of each individual defect is then determined. In that process, the tilt mirror 11 is tilted in a manner such that the following conditions are satisfied.

First, each of the defective pixel D3 on the image sensor 8, an image at a pixel position on the SLM 12 in a collinear optical axis with the defective pixel D1, an image at a position on the objective lens 4 (position of the image defect Gw on the recording side), an image at a position on the expander lens 7 (position of the image defect Gr on the reproducing side) should be incident on a pixel determined to be normal on the image sensor 8. If any image is incident on a pixel having a defect on the image sensor 8, the value of that image cannot be appropriately detected, and the presence or absence of that defect cannot be correctly determined.

Second, the image of the pixel defect on the SLM 12, the image of the image defect Gw on the recording side, and the image of the image defect Gr on the reproducing side should not be superimposed on the same pixel on the image sensor 8. If a plurality of images are incident and superimposed on the same pixel on the image sensor 8, the detected values of the individual images cannot be obtained. The presence or absence of each defect cannot be appropriately determined.

Third, the image of the pixel defect on the SLM 12, the image of the image defect Gw on the recording side, and the image of the image defect Gr on the reproducing side should not be superimposed in a collinear optical axis with the tilt mirror 11 tilted. This condition should be satisfied on the premise that a plurality of defects are caused, at least one of the SLM 12, the objective lens 4, and the expander lens 7.

When two pixels are determined to be defective on the image sensor 8, a pixel defect on the SLM 12, an image defect Gw on the recording side and an image defect Gr on the reproducing side can occur in a collinear optical axis with each of the two defective pixels on the image sensor 8. The defects occurring in a collinear optical axis with one defective pixel on the image sensor 8 might be the pixel defect on the SLM 12 and the image defect Gr on the reproducing side and the defects occurring in a collinear optical axis with the other defective pixel on the image sensor 8 might be only the image defect Gr on the reproducing side (i.e., two image defects might occur in the expander lens 7). Depending on the tilt angle of the laser beam (namely, the tilt angle of the tilt mirror 11), the image of the pixel defect on the SLM 12 and the image defect Gr on the reproducing side, which was not in a collinear optical axis with the pixel defect on the SLM 12, can be superimposed in a collinear optical axis with each other. If a plurality of images of defects are superimposed in a collinear optical axis with the tilt mirror 11 tilted, the two conditions are not satisfied. The presence or absence of the defects cannot be determined.

For this reason, the tilt angle of the tilt mirror 11 is set to satisfy the following conditions:

the images of the pixel defect on the SLM 12, the image defect Gw on the recording side, and the image defect Gr on the reproducing side should be incident on normal pixels on the image sensor 8, the images of the pixel defect on the SLM 12, the image defect Gw on the recording side, and the image defect Gr on the reproducing side should not be incident on the same pixel on the image sensor 8, and the images of the pixel defect on the SLM 12, the image defect Gw on the recording side, and the image defect Gr on the reproducing side should not be superimposed in a collinear optical axis with each other on the image sensor 8 with the laser beam tilted.

The incident positions of the images of the pixel defect on the SLM 12, the image defect Gw on the recording side, and the image defect Gr on the reproducing side shifting on the image sensor 8 in response to the tilting of the tilt mirror 11 are learned by the tilt angle of the tilt mirror 11 as previously discussed with reference to FIG. 15.

The incident position of the image of the pixel defect on the SLM 12 on the image sensor 8 is shifted by the shift amount Sslm based on the distance between the SLM 12 and the image sensor 8 and the tilt angle of the tilt mirror 11. Similarly, the incident position of the image of the image defect Gw on the recording side is shifted by the shift amount Sw based on the distance between the objective lens 4 and the image sensor 8 and the tilt angle of the tilt mirror 11, and the incident position of the image of the image defect Gr on the reproducing side is shifted by the shift amount Sr based on the distance between the objective lens 6 and the image sensor 8 and the tilt angle of the tilt mirror 11.

Based on the shift amount information, whether each image is incident on a normal pixel, i.e., whether the first condition is satisfied, is determined. Similarly, whether the images are not superimposed on the same pixel, i.e., whether the second condition is satisfied, is determined.

As for the third condition, the distance between the SLM 12, the objective lens 4, and the expander lens 7 is learned beforehand. The incident positions of the image of the pixel defect of the SLM 12 on the objective lens 4 and the expander lens 7 are determined with respect to the tilt angle of the laser beam. The incident position of the recording side image defect Gw on the expander lens 7 is also determined with respect to the tilt angle of the laser beam. Whether the third condition is satisfied is thus determined based on these pieces of information.

A variety of methods are contemplated to determine the tilt angle satisfying the three conditions and no specific methods are described herein.

The positions (pixels) of the images of the pixel defect on the SLM 12, the image defect Gw on the recording side, and the image defect Gr on the reproducing side are determined with the tilt mirror 11 tilted. By referencing the detected values obtained from the corresponding pixels, the presence or absence of each defect can also be determined.

With the tilt mirror 11 tilted, the images of the pixel defect on the SLM 12, the image defect Gw on the recording side, and the image defect Gr on the reproducing side are shifted from a pixel on the image sensor 8 determined to be defective. The value of the pixel on the image sensor 8 determined to be defective is detected again to determine the presence or absence thereon.

In this way, the pixel defect on the SLM 12, the image defect Gw on the recording side, and the image defect Gr on the reproducing side, and the image defect on the image sensor 8, all of which might be collinearly superimposed with each other with the tilt mirror 11 untilted, are individually determined in terms of presence or absence thereof.

To re-detect the presence or absence of each defect, the values of pixels determined to be the defective pixel D1 and the defective pixel D3 on the image sensor 8, and the values of pixels positioned at locations spaced from the defective pixels by the shift amount Sslm, the shift amount Sw, and the shift amount Sr, respectively, are detected with the laser diode LD on when all pixels on SLM 12 are modulated with bit 1/bit 0.

In the case of the detected value pattern (1,1,1) of the defective pixel D3, the defect is definitely determined to be the defect on the image sensor 8 (i.e., the defect on the reproducing side) as previously discussed with reference to FIG. 12B. The remaining process is to determine the presence or absence of the defect on the recording side. The determination of the presence or absence of the defective pixel D3 on the image sensor 8 and the image defect Gr on the reproducing side likely to occur in the same collinear optical axis is not necessary. In this case, the values of the pixels spaced from the defective pixel D3 by the shift amount Sslm and the shift amount Sw are re-detected to determine whether a defect also occurs on the recording side.

When the re-detected value of the pixel spaced by the shift amount Sw is determined, i.e., the image defect Gw on the recording side is determined, a determination of whether the detected value "1" is obtained in response to the modulation of bit 1 on the SLM 12 rather than in response to the modulation of bit 1/bit 0 on the SLM 12 is sufficient. This is because an image defect G causing the detected value "0" cannot be determined in terms of presence or absence in response to the bit 0 modulation on the SLM 12.

The re-detection of the value of pixel spaced by the shift amount Sslm, namely, the determination of the presence or absence of the pixel defect on the SLM 12 cannot be performed accurately without using the values detected with the modulation of both bit 1/bit 0 on the SLM 12.

To determine the presence or absence of each pixel likely to occur in a collinear optical axis with the defective pixel D3, the re-detection process is performed. In the re-detection process, the laser diode LD is switched on with the tilt mirror 11 tilted, and the value of the pixel spaced by the shift amount Sslm is detected in response to the modulation of bit 1/bit 0 on the SLM 12 and the value of the pixel spaced by the shift amount Sw is detected in response to the modulation of bit 1.

As the re-detection process result, the pixel defect on the SLM 12 is determined to be present if the detected value from the pixel spaced by the shift amount Sslm is "0" in response to bit 1 and "1" in response to bit 0.

The image defect Gw on the recording side is determined to be present if the detected value of the pixel spaced by the shift amount Sw is "0" in response to the modulation of bit 1.

Whether the pixel defect on the recording side occurs is determined considering the thus determined pixel defect on the image sensor 8 (the image defect on the reproducing side) together with the determination result of the presence or absence of the pixel defect on the SLM 12 and the presence or absence of the image defect Gw on the recording side. More specifically, if one of the pixel defect on the SLM 12 and the image defect Gw on the recording side is present, the defect is also found to occur on the recording side. As a result, the defects are determined to occur on both the recording side and the reproducing side.

If neither the pixel defect on the SLM 12 nor the image defect Gw on the recording side is present, only the reproducing side suffers from the defect.

As described with reference to FIG. 12B, as for pixels determined to be in the defective pixel D1 (0,0,0), defect creation mode considered in a collinear optical axis may be on the recording side only, on the reproducing side, or on both the recording side and the reproducing side. Determination is thus performed on the presence or absence of the pixel defect on the image sensor 8, the presence or absence of the image defect Gr on the reproducing side, the presence or absence of the image defect Gw on the recording side, and the presence or absence of the pixel defect on the SLM 12.

The presence or absence of the pixel defect on the image sensor 8 is described first. In the case of the detected value pattern (0,0,0), the defective pixel D1 fixed to "1" is unlikely to occur on the image sensor 8. It is sufficient if the presence or absence of the pixel defect on the image sensor 8 is determined by determining whether the pixel is fixed to bit 0. More specifically, the value of the defective pixel D1 is detected in response to only the modulation bit 1, and if the value detected in response to the modulation of bit 1 is "0," the pixel defect on the image sensor 8 is determined to be present.

To determine the presence or absence of the image defect Gr on the reproducing side, the pixel value of the pixel spaced by the shift amount Sr from the pixel determined to be the defective pixel D1 is detected with the laser diode LD on in response to the modulation of bit 1 on the SLM 12. As previously discussed, the presence or absence of the image defect Gr cannot be determined in response to the modulation of bit 0.

If the value detected in response to the modulation of bit 1 is "0," the image defect Gr is determined to be present on the reproducing side.

To determine the presence or absence of the image defect Gw on the recording side, the value of the pixel spaced by the shift amount Sw from the pixel determined to be the defective pixel D1 is detected in response to the modulation of bit 1 on the SLM 12 with the laser diode LD on. If the value detected in response to the modulation of bit 1 is "0," the image defect Gw is determined to be present on the recording side.

To determine the presence or absence of the pixel defect on the SLM 12, the value of the pixel spaced by the shift amount Sslm from the pixel determined to be the defective pixel D1 is detected in response to the modulation of bit 1/bit 0 on the SLM 12 with the laser diode LD on. If the value detected in response to the modulation of bit 1 is "0," or if the detected value in response to the modulation of bit 0 is "1," the pixel defect is determined to be present on the SLM 12.

The presence or absence of pixels likely to occur in a collinear optical axis with the pixel determined to be the defective pixel D1 is individually determined. More specifically, as for the defective pixels D1, all of the pixel defects on the image sensor 8, the image defect Gr, the image defect Gw, and the pixel defect on the SLM 12 are determined in terms presence or absence.

If the determination result shows that neither the image defect Gw on the recording side nor the pixel defect on the SLM 12 is present, and that at least one of the pixel defect on the image sensor 8 and the image defect Gr on the reproducing side is present, the defect is determined to be present on the reproducing side only.

Conversely, if the determination result shows that neither the pixel defect on the image sensor 8 nor the image defect Gr on the reproducing side is present, and that at least one of the image defect Gw on the recording side and the pixel defect on the SLM 12 is present, the defect is determined to be present on the recording side only.

If the determination result shows that one of the image defect Gw on the recording side and the pixel defect on the SLM 12 is present and that one of the pixel defect on the image sensor 8 and the image defect Gr on the reproducing side is present, the defects are determined to be present on both the recording side and the reproducing side.

The determination result of the presence or absence of each of the pixel defect on the image sensor 8, the image defect Gr, the image defect Gw, and the pixel defect on the SLM 12 determines whether the defective pixel D1 occurs on the reproducing side only, on the recording side only, or on both the recording side and the reproducing side.

For convenience of explanation, the re-detection operation of the defective pixel D1 and the re-detection operation of the defective pixel D3 have been separately discussed. For each operation, all pixels on the SLM 12 are modulated with bit 1/bit 0. The result of the modulation performed only once by the SLM 12 may be shared by the re-detection of the defective pixel D1 and the re-detection of the defective pixel D3.

More specifically, in response to the modulation of bit 1, the values of the pixels spaced from the defective pixel D3 on the image sensor 8 by the shift amount Sslm, and the shift amount Sw are detected and the values of the pixels spaced from the defective pixel D1 on the image sensor 8 by the shift amount Sslm, the shift amount Sw and the shift amount Sr are detected.

In response to the modulation of bit 0, the value of the pixel spaced from the defective pixel D3 by the shift amount Sslm and the value of the pixel spaced from the defective pixel D1 by the shift amount Sslm are also detected.

Allowing the SLM 12 to perform a single modulation of bit 1/bit 0 for the re-detection of the defective pixel D3 and the defective pixel D1 shortens time required for discrimination than allowing the SLM 12 to perform the modulation of bit 1/bit 0 for each of the re-detection of the defective pixel D3 and the re-detection of the defective pixel D1.

The value re-detected from the defective pixel D1 in response to the modulation of bit 1 on the SLM 12 is referred to as "Pd1." The values detected from the pixels spaced from the defective pixels (D1 and D3) by the shift amount Sslm, the shift amount Sw and the shift amount Sr in response to the modulation of bit 1 on the SLM 12 are respectively referred to as "Pon-1$slm$," "Pon-1$w$," and "Pon-1$r$."

The value detected from the pixel spaced from the defective pixels (D1 and D3) by the shift amount Sslm in response to the modulation of bit 0 on the SLM 12 is referred to as "Pon-0$slm$."

The images of the pixels determined to be the defective pixel D1 and the defective pixel D2 are shifted by tilting the tilt mirror 11. The image defect Gr on the reproducing side, the image defect Gw on the recording side, and the pixel defect on the SLM 12 (further the pixel defect on the image sensor 8 as the defect D1), which might be collinearly superimposed, are determined in terms of presence or absence. Based on the determination result, the defect creation mode (the recording side only, the reproducing side only or on both the recording side and the reproducing side) is thus identified.

After the defect creation mode is identified, an averaging divisor in the oversampling process may be changed if the defect (at least one of the pixel defect on the image sensor 8 and the image defect Gr on the reproducing side) occurs on the reproducing side.

In the previously discussed oversampling process, the signal light (diffracted light) for the reproducing operation obtained by directing the reference light to the hologram recording medium 5 is expanded to detect the value of one pixel of the signal light using a plurality of pixels on the image sensor 8. The sum of the detected values of the plurality of pixels is averaged to detect the value of the pixel. As previously discussed, a set of the plurality of pixels on the image sensor 8 to read the value of the one pixel is referred to as an oversampling pixel block.

If a defect occurs on the reproducing side in the oversampling process, a value cannot be normally detected from any pixel in the oversampling pixel block. If the oversampling process is performed in this condition, the value of the one pixel cannot be detected in the oversampling pixel block containing the defective pixel. For example, one oversampling pixel block might be composed of four pixels, and the value of the defective pixel might be bit 0 while the correct value thereof is bit 1. The pixels should provide as the detected values 1+1+1+1=4, but the actual value is 1+1+1=3. The final detected output of this oversampling pixel block is averaged by 4. The sum of the pixel values is "3" and the final output value is thus ¾, which is smaller than the expected output 4/4=1. If such a defective pixel is contained, the value of one pixel resulting from the oversampling process becomes different from the expected output. Erroneous detection thus occurs.

In accordance with the present embodiment, if a defect occurring on the reproducing side falls within the oversampling pixel block, that defective pixel is excluded from the oversampling process and the averaging divisor in the oversampling process is changed depending on the number of defective pixels. More specifically, the averaging divisor is calculated by subtracting the number of defective pixels from the overall number of pixels in one oversampling pixel block.

The result (1+1+1+0)/4=¾ is corrected to be (1+1+1)/3=1. The oversampling process performed in this way provides a result more accurate than the oversampling process not excluding the defective pixel.

Depending on the manner of defect creation on the reproducing side, even all pixels in the oversampling pixel block can be defective. In such a case, the whole oversampling pixel block is excluded from the oversampling process.

Even when all pixels are not defective, the whole oversampling pixel block containing a defective pixel can be excluded from the oversampling process.

For example, when the number of defective pixels is relatively large with respect to the overall number of pixels in a given oversampling pixel block, detection of the pixel values can be adversely affected even with the presence of still normal pixels. In such a case, the exclusion of the whole oversampling pixel block may be probably advisable from the standpoint of maintaining reproduced signal quality. However, it is considered that such an exclusion may be dependent on system performance, the use of the normal pixel is set to be selectable.

More specifically, if a defective pixel is present in a oversampling pixel block, whether to use the whole oversampling pixel block may be set in response to user operation. If the setting to exclude the whole oversampling pixel block is set, the whole oversampling pixel block is excluded from the oversampling process. If the setting to use the oversampling pixel block is set, the oversampling process is performed by averaging the normal pixels (in this case as well, the averaging divisor is changed depending on the number of pixels in use).

In the first function, the recording and reproducing apparatus 1 of the present embodiment determines the defective pixel based on the values of the pixels on the image sensor 8 detected when all pixels on the SLM 12 are modulated with bit 1/bit 0 with the laser diode LD on. The recording and reproducing apparatus 1 thus first determines the presence or absence of the defective pixel.

In the second function, the recording and reproducing apparatus 1 sorts the pixels determined to be defective (namely, sorts out the defective pixels by section into one on the reproducing side, one on the recording side, and ones on both the recording side and the reproducing side).

More specifically, first, a pixel (defective pixel D2) having (1,1) as the pixel value detected in response to the modulation of bit 1/bit 0 is detected in value again with the laser diode LD off. If the detected value becomes "0" with the laser diode LD off (i.e., if the detected value pattern (1,1,0) results), the defect occurring in a collinear optical axis with that pixel is identified as the one on the recording side only (with the SLM 12 fixed to bit 1).

The pixel having the detected value pattern (1,1,1) (defective pixel D3) and the pixel having the detective value "0" responsive to the modulation of bit 1 in the first function (defective pixel D1 having the detected value pattern (0,0,0)) cannot be identified in terms of the defect creation mode even if the detected value patterns thereof are successfully determined. The images are then shifted to satisfy the previously-mentioned conditions with the tilt mirror 11 tilted, and the determination of the presence or absence of the defective pixel is then performed.

As for the defective pixel D3, determination is performed as to the presence or absence of the pixel defect on the SLM 12 and the image defect Gw on the recording side.

As for the defective pixel D1, determination is performed as to the presence or absence of the pixel defect on the image sensor 8, the image defect Gr on the reproducing side, the image defect Gw on the recording side and the pixel defect on the SLM 12.

As a result, the pixels having been determined as the defective pixel D1 and the defective pixel D3 are identified as one on the reproducing side only, one on the recording side, or ones on both the recording side and the reproducing side.

In accordance with the present embodiment, all pixels determined to be defective are determined to occur on the recording side only, on the reproducing side only, and on both the recording side and the reproducing side.

The defect creation mode is thus identified. For example, if the defect lies in the recording side only, the pixel on the SLM 12 in a collinear optical axis with the pixel on the image sensor 8 determined to be defective may be excluded from use during the recording operation. Such a preventive step avoids persistent degradation in recorded signal quality.

If the defect is found to be on the reproducing side only, the pixel on the image sensor 8 determined to be defective is excluded from use during the reproducing operation. In this way, persistent degradation in reproduced signal quality is avoided.

If the defects are found to be present on both the recording side and the reproducing side, the pixel on the image sensor 8 determined to be defective is excluded from using during the reproducing operation and the pixel on the SLM 12 in a collinearly optical axis with the pixel on the image sensor 8 determined to be defective is excluded from use during the recording operation. The recording and reproducing quality is prevented from being degraded.

The pixel on the image sensor 8 determined to be a defect on the reproducing side is excluded from use in the oversampling process and the averaging divisor of the oversampling pixel block containing the defective pixel in the oversampling process is modified depending on the number of defective pixels. The oversampling process performed in this way provides a result more accurate than the oversampling process not excluding the defective pixel.

When the defect creation mode is identified in accordance with the present embodiment, the creation pattern of the pixel defect on the image sensor 8 and the pixel defect on the SLM 12 is defined based on only the ones likely to occur. During the determination process, the detected value patterns likely to occur actually are examined as shown in FIG. 12B. The determination process is thus performed at high speed.

Depending on the number of defective pixels, the recording operation or the reproducing operation cannot function normally with an error rate above a predetermined value. In accordance with the present embodiment, the presence or absence of a defect may determined in the first function, the number of pixels determined to be defective may then be counted, and a disorder determination of the optical system may be performed based on the number of defective pixels.

With reference to flowcharts of FIGS. 16 through 20, the defect determination process of embodiments is described below.

The controller 15 of FIG. 1 performs the determination process in accordance with a program (not shown) stored on a read-only memory (ROM) housed therewithin.

Figure 16:
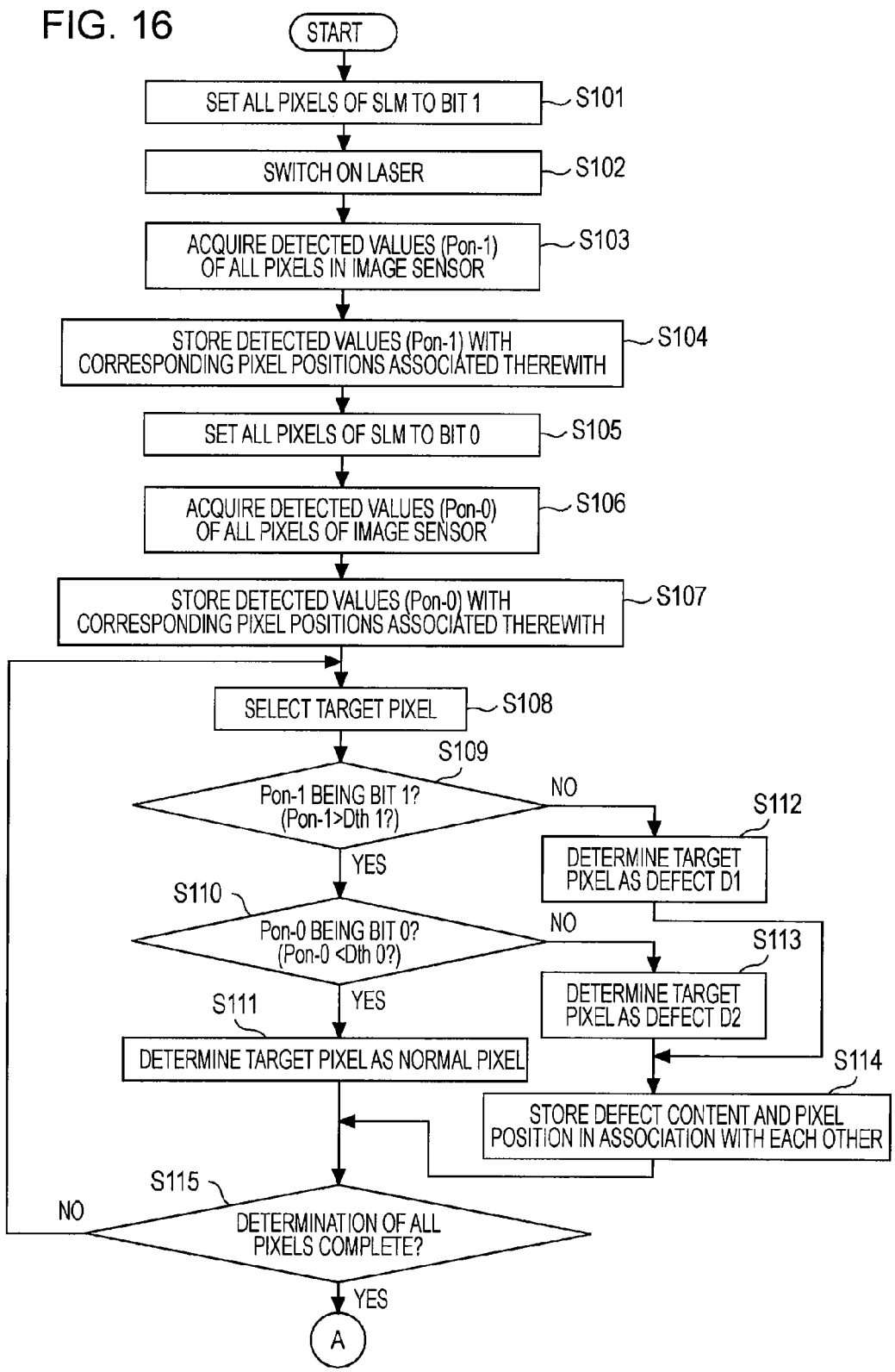
FIG. 16 is a flowchart of a defect determination process in which the presence or absence of a defective pixel, a defective pixel D1 and a defective pixel D2 are determined in accordance with one embodiment.
Figure 17:
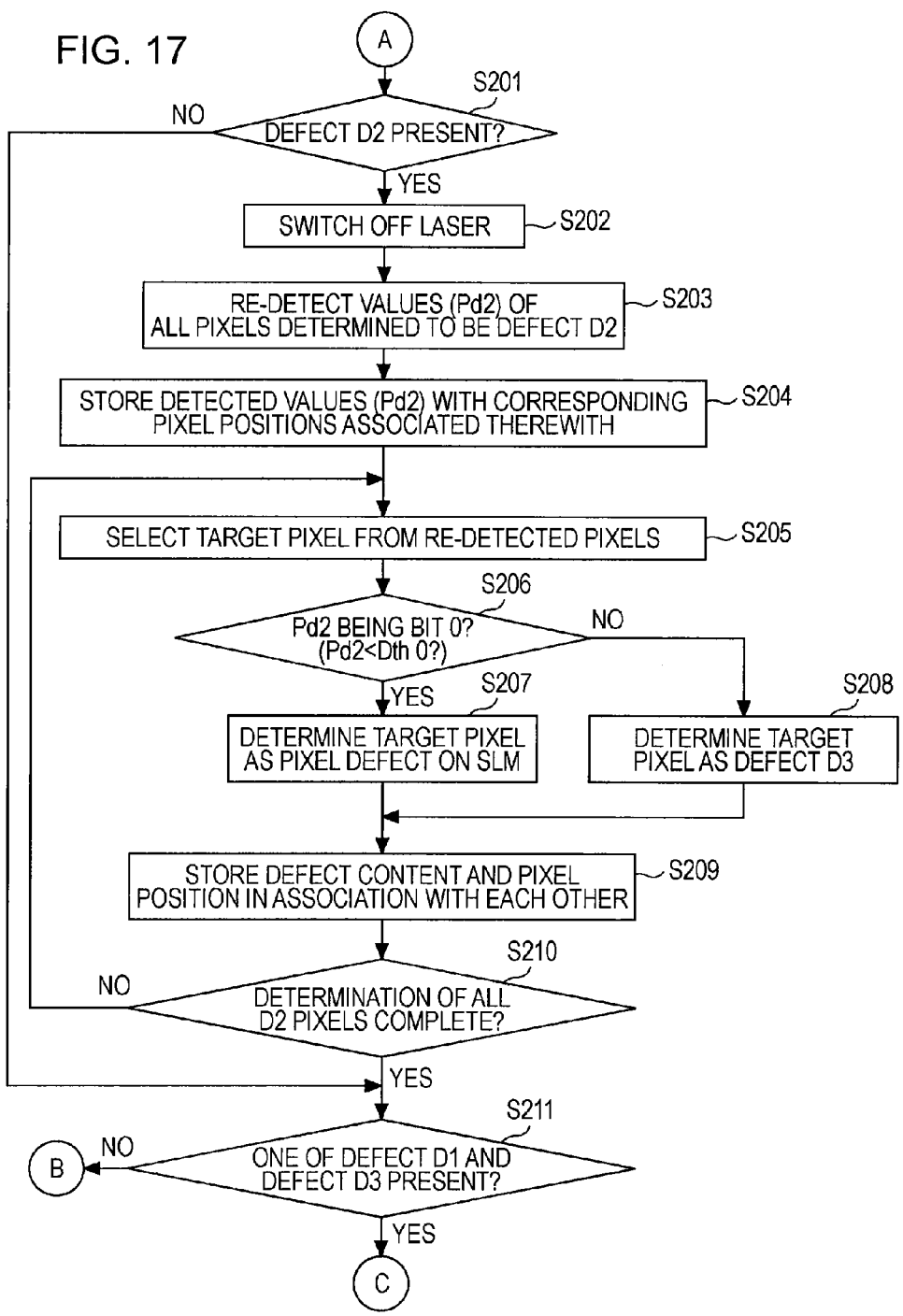
FIG. 17 is a flowchart of a defect determination process that sorts a defect D3 from the defective pixels D2 by detecting defects again with a laser diode LD switched off.

With reference to FIGS. 16 through 20, a series of process steps from the determination of the presence or absence of a defective pixel to the identification of the defect content of a pixel determined to be defective. More specifically, FIG. 16 illustrates the determination process of the presence or absence of a defective pixel and the determination process performed on the defective pixel D1 in the detected value pattern (0,0,0) and the defective pixel D2 having the detected value (1,1). FIG. 17 illustrates the re-detection process performed on the defective pixel D2 with the laser diode LD off to discriminate the defective pixel D2 from the defective pixel D3 having the detected value pattern (1,1,1).

Figure 18:
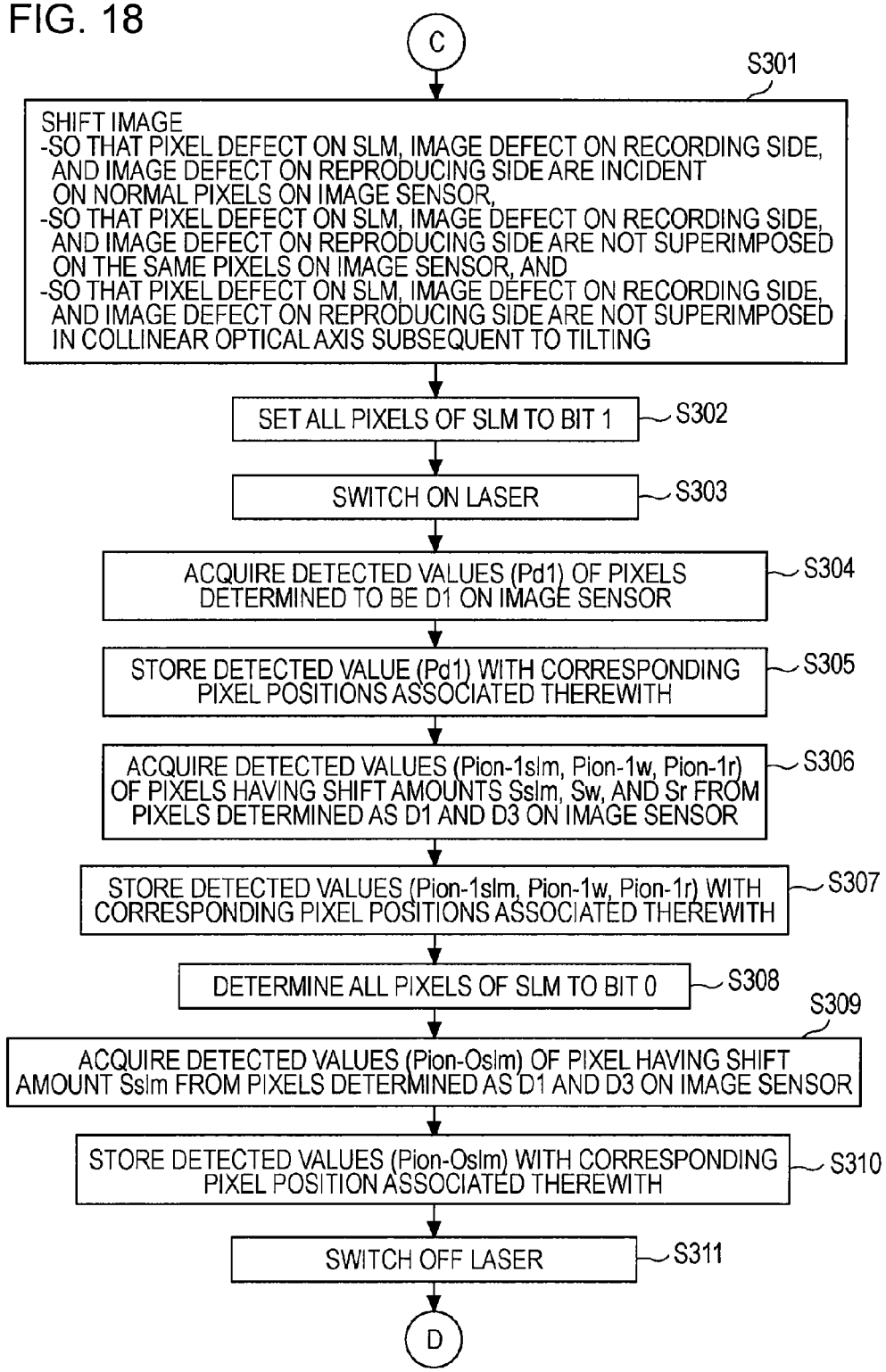
FIG. 18 is a flowchart of a defect determination process that is performed to detect again the defective pixel D1 and the defective pixel D3.
Figure 19:
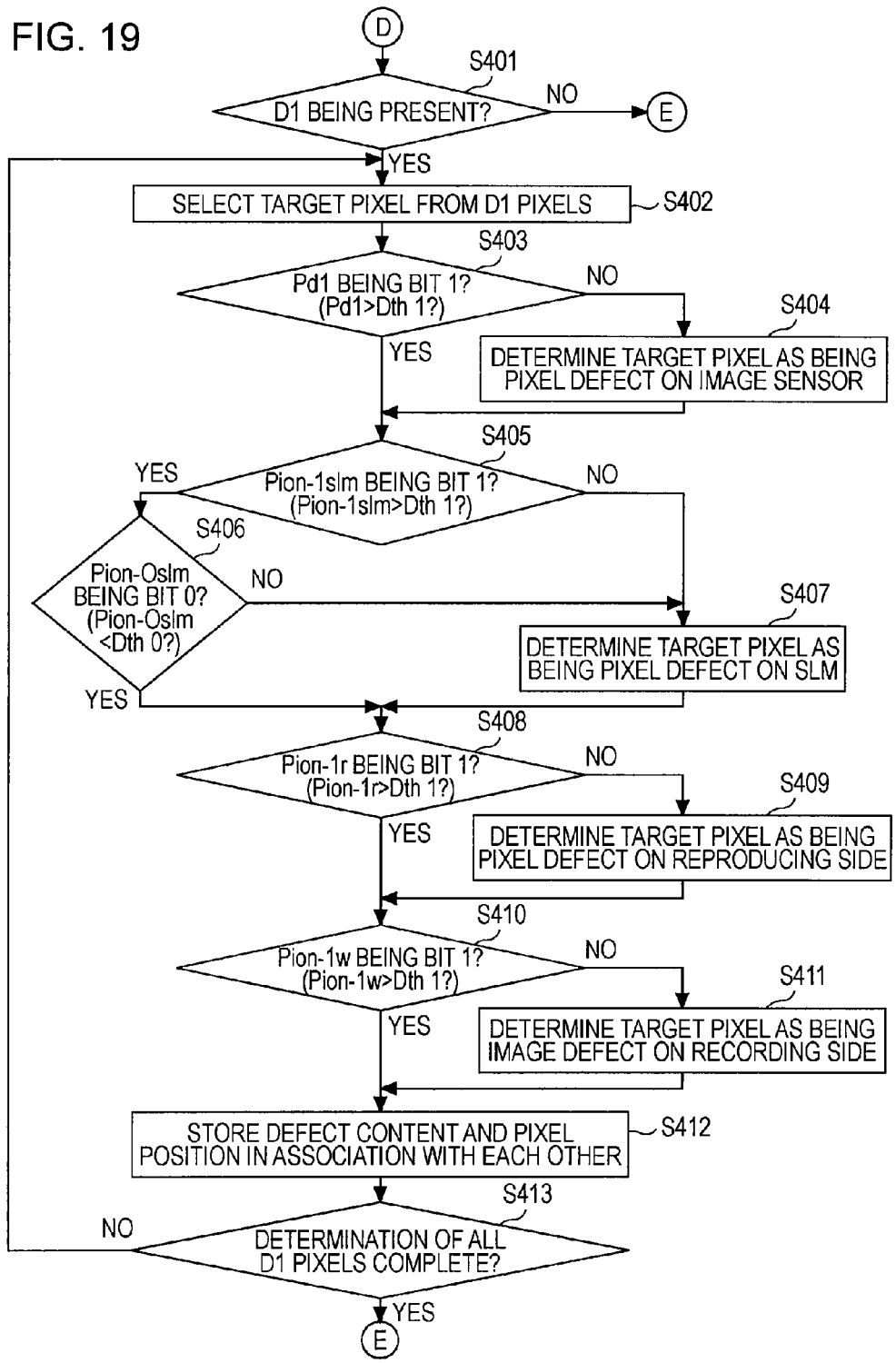
FIG. 19 is a flowchart of a defect determination process that is performed to determine the presence or absence of the defective pixel D1 based on the re-detection result obtained in the process of FIG. 18.
Figure 20:
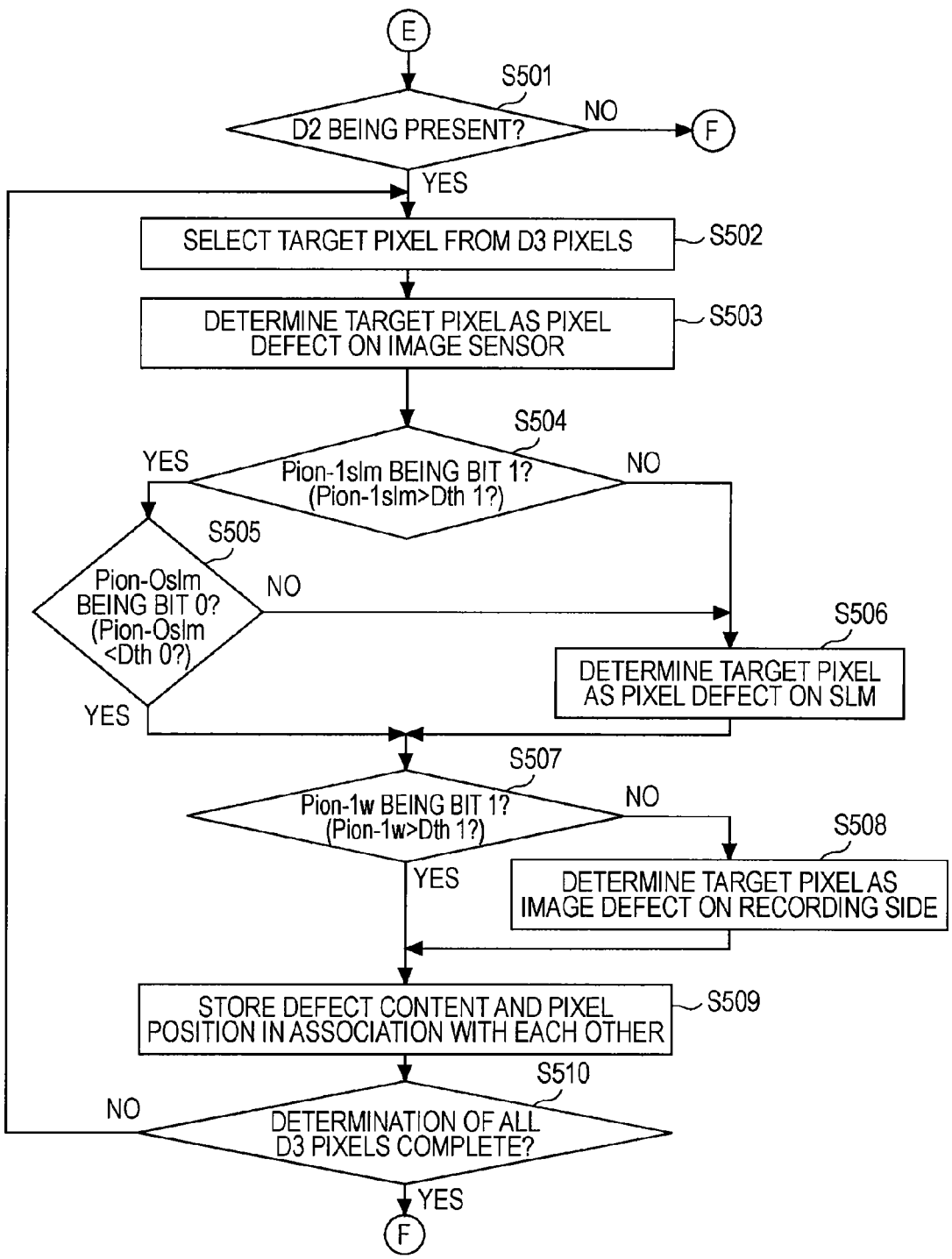
FIG. 20 is a flowchart of a defect determination process that is performed to determine the presence or absence of the defective pixel D3 based on the re-detection result obtained in the process of FIG. 18.

FIG. 18 illustrates the process performed in response to the re-detection process to determine the presence or absence of each of the defective pixel D1 and the defective pixel D3. FIG. 19 illustrates the determination process of the presence or absence of the defective pixel D1 based on the re-detection result of FIG. 18. FIG. 20 illustrates the determination process of the presence or absence of the defective pixel D3 based on the re-detection result of FIG. 18.

Figure 21:
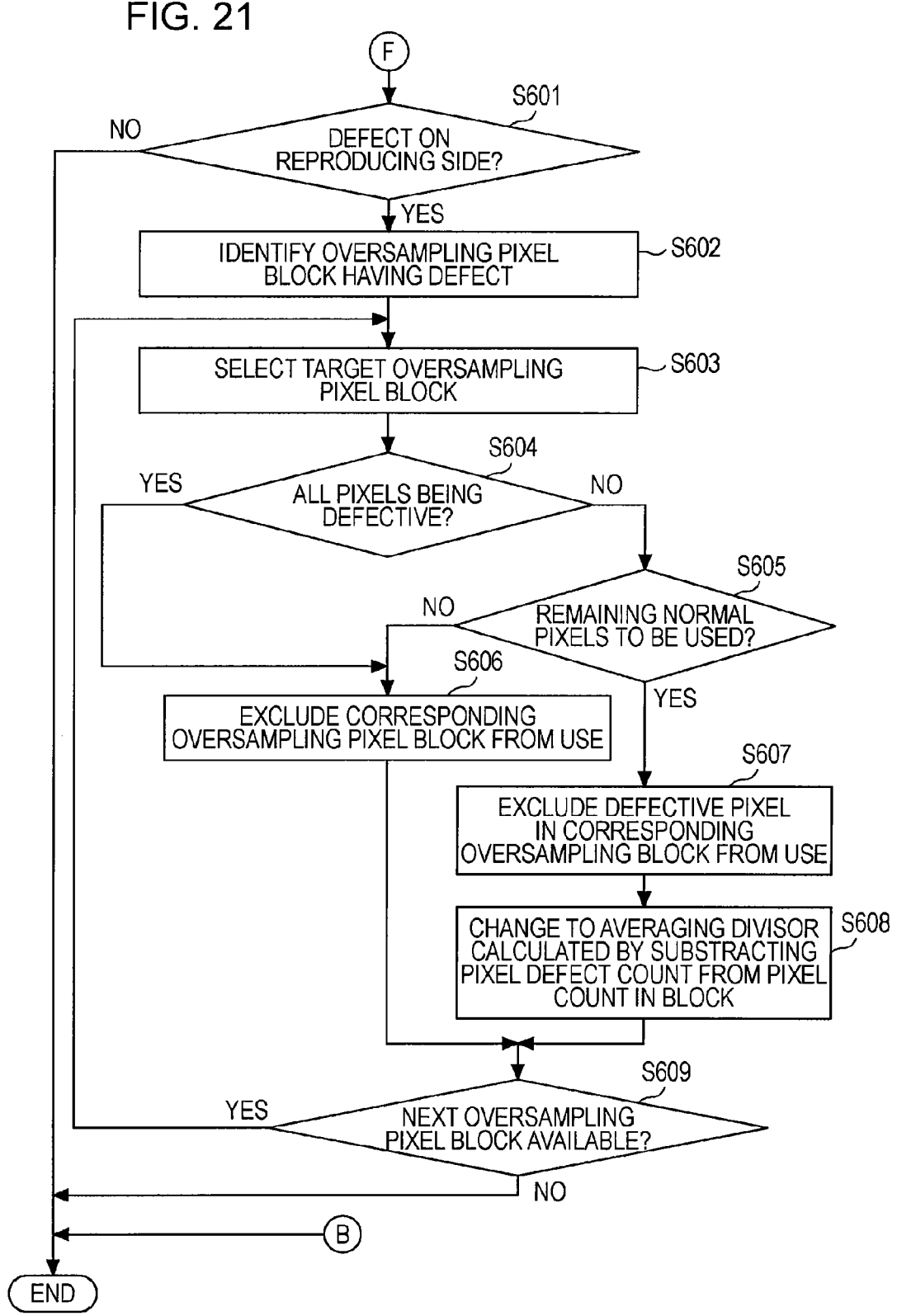
FIG. 21 is a flowchart illustrating a process of modifying setting in an oversampling process performed when the reproducing side has a defect.

FIG. 21 illustrates a process that modifies the setting in the oversampling process when a defect occurs on the reproducing side.

As shown in FIG. 16, all pixels on the SLM 12 are set to bit 1 in step S101. More specifically, an instruction is issued to the data modulator 14 of FIG. 11 to generate data of all bit 1. A driving signal responsive to the data drives each pixel on the SLM 12 to set all pixels on the SLM 12 to bit 1.

In step S102, the controller 15 performs a control step to switch on the laser diode LD of FIG. 11 in a laser on process.

In step S103, the controller 15 acquires the detected values (Pon-1) of all pixels on the image sensor 8. In step S104, the controller 15 stores the detected values Pon-1 with corresponding pixel positions associated therewith. The detected values with the corresponding pixel positions associated therewith (Pon-1, and Pon-0, Pd2, Pd1, Pon-1$lsm$, Pon-1$w$, Pon-1$r$, and Pon-0$slm$ to be discussed later) may be stored on a random-access memory (RAM) in the controller 15, for example.

In steps S105, S106, and S107, the detected value Pon-0 responsive to the modulation of bit 0 is acquired. More specifically, all pixels on the SLM 12 are set to bit 0 in step S105, detected values Pon-0 of all pixels on the image sensor 8 are acquired in step S106, and the acquired detected values Pon-0 are stored with the corresponding pixel positions thereof associated therewith.

In step S108, a target pixel is selected. More specifically, a target pixel to be determined is selected from all pixels on the image sensor 8 in accordance with a predetermined order.

In step S109, the controller 15 determines whether the Pon-1 of the selected pixel is a value responsive to bit 1.

As previously discussed, if a defect is an image defect G only, a drop is caused in contrast only, and leads no data missing. Determination of whether the detected value Pon-1 is bit 1 is performed according a predetermined threshold (Dth1 as shown). The predetermined threshold Dth1 may be determined based on test results concerning output characteristics of the image sensor 8 in which the SLM 12 performs modulation of bit 1.

If it is determined in step S109 that the detected value Pon-1 is not bit 1, processing proceeds to step S112 to determine that the defect is a defective pixel D1. More specifically, if the detected value Pon-1 responsive to the modulation of bit 1 on the SLM 12 is not bit 1 (namely bit 0), the pixel has a detected value pattern (0,0,0) as shown in FIG. 12B, and thus the defect is determined to be defective pixel D1.

If it is determined in step S112 that the defect is the defective pixel D1, processing proceeds to step S114 to store the defect content in association with the corresponding pixel position. Mapping information for associating the pixel position of the defective pixel with the defect content may also be stored on the RAM in the controller 15.

Subsequent to step S114, the controller 15 determines in step S115 whether all pixels are determined. If it is determined in step S115 that all pixels have not been determined, processing returns to step S108 to select a target pixel. A next target pixel is thus selected. If it is determined in step S115 that all pixels have been determined, processing proceeds to the process of FIG. 17.

If it is determined in step S109 that the detected value Pon-1 is bit 1, the controller 15 determines in step S110 whether the detected value Pon-0 is bit 0. Determination of whether the detected value Pon-0 is bit 0 is also performed according to a predetermined threshold Dth0. The predetermined threshold Dth0 may be determined based on test results concerning output characteristics of the image sensor 8 in which the SLM 12 performs modulation of bit 0 (or the inputting of the laser light to the SLM 12 is blocked).

If it is determined in step S110 that the detected value Pon-0 is bit 0, the detected value of the pixel is (1,0) responsive to the modulation of bit 1 and the modulation of bit 0, and falls within the detected value pattern (1,0,0) as shown in FIG. 12B. In step S111, the controller 15 determines that the pixel is normal.

Since no particular step is taken for the normal pixel in accordance with the present embodiment, storage of information of the pixel position is not required. Since pixel position information and content of only a defective pixel is stored, all pixels other than the defective pixel are identified as normal.

If it is determined in step S111 that the pixel is normal, processing proceeds to step S115.

If it is determined in step S110 that the detected value Pon-0 is not bit 0, the controller 15 proceeds to step S113 to determine that the pixel is the defective pixel D2. A non-affirmative answer to the determination in step S110 means that the detected value of the pixel responsive to the modulation of bit 1/bit 0 on the SLM 12 is (1,1), and that the defect is the defective pixel D2 having one of the detected value patterns (1,1,0) and (1,1,1).

After the determination of the defective pixel D2 in step S113, processing proceeds to step S114 to store the defect content and the pixel position in association with each other. Processing proceeds to step S115.

When all pixels have been determined in step S115, processing proceeds to the process of FIG. 17.

With reference to FIG. 17, the controller 15 determines in step S201 whether a defective pixel D2 is present. In step S201, the controller 15 references the mapping information associating the pixel position with the defect content stored on the RAM and determines whether no defective pixel D2 is present. If it is determined in step S201 that no defective pixel D2 is present, processing proceeds to step S211 as shown in FIG. 17. The controller 15 determines in step S211 whether one of the defective pixel D1 and the defective pixel D3 is present.

If it is determined in step S211 that neither the defective pixel D1 nor the defective pixel D2 is present, the controller 15 determines that none of the defective pixel D1, the defective pixel D2, and the defective pixel D3 is present. In this case, all pixels are normal, and processing thus ends as shown in FIG. 21.

If it is determined in step S211 that one of the defective pixel D1 and the defective pixel D3 is present, processing proceeds to the process of FIG. 18.

If it is determined in step S201 that the defective pixel D2 is present, the controller 15 performs sorting process on the defective pixel D2 (between the detected value pattern (1,1,0) or (1,1,1)) through steps S202-S210.

In step S202, the controller 15 performs a control process with the laser diode LD off (laser off process).

The controller 15 re-detects the value (Pd2) of the pixel determined to be the defective pixel D2 in step S203, and stores the detected value Pd2 with the respective pixel position associated therewith in step S204.

For convenience of explanation, the controller 15 switches off the laser diode LD at the timing it is determined that the defective pixel D2 is present. The laser diode LD remains switched on from step S102 of FIG. 16 to step S202 of FIG. 17. Even after the completion of step S107 that requires the laser diode LD to be on, the laser diode LD still unnecessarily remains on.

The laser diode LD can thus be switched off at the completion of step S107. Alternatively, the laser diode LD may be switched on and then off at each of the detected value acquisition process in each of steps S103 and S107.

This arrangement prevents the laser diode LD from remaining unnecessarily switched on, reducing power consumption.

In step S205, the controller 15 selects a target pixel from pixels to be re-detected, more specifically, selects a target pixel to be determined from the defective pixels D2 with the detected value Pd2 thereof detected.

After selecting the target pixel, the controller 15 determines in step S206 whether the detected value Pd2 is bit 0. If it is determined in step S206 that the detected value Pd2 is bit 0, the detected value pattern of that pixel is (1,1,0). Processing proceeds to step S207 to determine that the pixel is a pixel defect on the SLM 12.

From the foregoing discussion, the controller 15 determines that the defect occurring in a collinear optical axis with that pixel is a defect on the recording side only by determining that the defect is the "pixel defect on the SLM 12."

If it is determined in step S206 that the detected value Pd2 is not bit 0, the detected value pattern is (1,1,1). Processing proceeds to step S208 to determine that the defect is the defective pixel D3.

The controller 15 stores in step S209 the defect content and the pixel position in association with each other subsequent to the determination of the pixel defect on the SLM 12 in step S207 or subsequent to the determination of the defective pixel D3 in step S208.

The controller 15 determines in step S210 whether all defective pixels D2 have been determined. If it is determined in step S210 that not all defective pixels D2 have been determined, processing returns to step S205 to select a target pixel again.

If it is determined in step S210 that all defective pixels D2 have been determined, processing proceeds to step S211 to determine whether one of the defective pixel D1 and the defective pixel D3 is present. As previously discussed if it is determined in step S211 that neither the defective pixel D1 nor the defective pixel D3 is present, the controller 15 completes the process of FIG. 21. If it is determined in step S211 that one of the defective pixel D1 and the defective pixel D3 is present, processing proceeds to the process of FIG. 18.

In step S301 of FIG. 18, the controller 15 performs image shift process in a manner that satisfies the conditions that the images of the pixel defect on the SLM 12, the image defect Gw on the recording side, the image defect Gr on the reproducing side are incident on normal pixels on the image sensor 8, that the images of the pixel defect on the SLM 12, the image defect Gw on the recording side, the image defect Gr on the reproducing side are not superimposed on the same pixel on the image sensor 8, and that the images of the pixel defect on the SLM 12, the image defect Gw on the recording side, the image defect Gr on the reproducing side are incident not in a collinearly optical axis on the image sensor 8 with the laser beam tilted.

The images of the defects likely to be in a collinear optical axis with a pixel on the image sensor 8 determined to be defective from the preceding determination process include the image of the pixel defect on the SLM 12 in a collinear optical axis with the defective pixel D2, and the image of the pixel defect on the SLM 12 likely to be occur in a collinear optical axis with each of the defective pixel D1 and the defective pixel D3, the image of the image defect Gw on the recording side, and the image of the image defect Gr on the reproducing side. The tilt angle of the tilt mirror 11 satisfying the above conditions is thus calculated based on the shift amount information of these images on the image sensor 8 responsive to the tilt angle of the tilt mirror 11, the incident position of the pixel defect of the SLM 12 on the objective lens 4 and the expander lens 7 responsive to the tilt angle of the tilt mirror 11, and the incident position of the image of the image defect Gw on the recording side on the expander lens 7.

The controller 15 controls the tilt mirror 11 to tilt in this way.

A variety of methods are contemplated as a method to determine the tilt angle of the tilt mirror 11 satisfying the above three conditions, and the embodiments are not limited to any particular method.

If a relatively large number of pixels are defective, not all pixels cannot satisfy the above conditions at one tilt angle of the tilt mirror 11. In such a case, the pixel defects to be determined are divided into groups, and the defect sorting process is performed with the tilt angle of the tilt mirror 11 adjusted to satisfy the conditions (including the re-detection process subsequent to image shifting, and the determination process of the presence or absence of each defect based on the re-detection result).

In step S302, the controller 15 sets all pixels on the SLM 12 to bit 1 in the same manner as in step S102. In step S303, the controller 15 performs a control process to switch on the laser diode LD (laser on process) as in step S103.

In step S304, the controller 15 acquires the detected value (Pd1) of the pixel on the image sensor 8 determined to be the defective pixel D1. In step S305, the image sensor 8 stores the detected value Pd1 with the pixel position associated therewith. The re-detected value Pd1 is required to determine the presence or absence of the pixel defect on the image sensor 8.

In step S306, the controller 15 acquires the detected values of the pixels spaced from the pixels determined to be the defective pixel D1 and the defective pixel D3 on the image sensor 8 by the shift amount Sslm, the shift amount Sw, and the shift amount Sr (Pon-1$slm$, Pon-1$w$, and Pon-1$r$). The shift amounts Sslm, Sw, and Sr are calculated from the set tilt angle of the tilt mirror 11 and the distances between the image sensor 8 and each of the SLM 12, the data modulator 14 and the expander lens 7.

In step S307, the controller 15 stores the detected values (Pon-1$slm$, Pon-1$w$, and Pon-1$r$) with the corresponding pixel positions associated therewith. The detected values Pon-1$slm$, Pon-1$w$, and Pon-1$r$ are used to determine the presence or absence of each of the pixel defect on the SLM 12, the image defect Gw on the recording side, and the image defect Gr on the reproducing side, each possibly occurring in a collinear optical axis with each of the defective pixel D1 and the defective pixel D3.

From the foregoing description, the pixel determined to be the defective pixel D3 is definitely the pixel defect on the image sensor 8 (i.e., the defect on the reproducing side). From the standpoint of identifying the defect creation mode, the remaining process is sufficient if the defect on the recording side is determined (concerning the presence or absence of the pixel defect on the SLM 12 and the presence or absence of the image defect Gw on the recording side). In step S306, the controller 15 does not require the acquisition of the detected value of the pixel spaced from the defective pixel D3 by the shift amount Sr to be used for the determination of the presence or absence of the image defect Gr on the reproducing side with reference to the defective pixel D3.

In step S308, the controller 15 sets all pixels on the SLM 12 to bit 0. In step S309, the controller 15 acquires the detected values (Pon-0$slm$) of the pixels spaced from the pixel determined to be the defective pixels D1 and D3 on the image sensor 8 by the shift amount Sslm. In step S310, the controller 15 stores the detected value (Pon-0$slm$) with the pixel position thereof associated therewith. The detected values Pon-0$slm$ are required to determine the presence or absence of the pixel defect on the SLM 12.

Subsequent to step S310, processing proceeds to step S311 to perform a laser off process with the laser diode LD off. Processing then proceeds to the process of FIG. 19.

FIG. 19 illustrates the determination of presence or absence of each defect that might occur in a collinear optical axis with the defective pixel D1.

In step S401, the controller 15 determines whether a defective pixel D1 is present. If it is determined in step S401 that no defective pixel D1 is present, processing proceeds to step S501 of FIG. 20.

If the answer to the determination in step S401 is affirmative with the presence of the defective pixel D1, the controller 15 selects a target pixel from the defective pixels D1. More specifically, the controller 15 selects as a target pixel one pixel from the pixels on the image sensor 8 determined to be defective pixels D1.

In step S403, the controller 15 determines whether the detected value Pd1 of the selected defective pixel D1 is bit 1. If it is determined in step S403 that the detected value Pd1 is not bit 1, processing proceeds to step S404 to determine that the defect is the pixel defect on the image sensor 8.

More specifically, that the value of the defective pixel D1, detected in response to the modulation of bit 1 on the SLM 12, with the images shifted in response to the tilting of the tilt mirror 11 is not bit 1 is interpreted that a defect being fixed to bit 0 occurs as the defective pixel D1.

Processing proceeds to step S405.

If it is determined in step S403 that the detected value Pd1 of the selected defective pixel D1 is bit 1, the controller 15 proceeds to step S405 without determining the pixel defect on the image sensor 8 in step S404.

In step S405, the controller 15 determines whether the detected value Pon-1$slm$ is bit 1. More specifically, the controller 15 determines whether the value of the pixel spaced from the defective pixel D1 selected in step S402 by the shift amount Sslm is bit 1 in response to the modulation of bit 1 on the SLM 12.

If the answer to the determination in step S405 is affirmative with bit 1, the controller 15 determines in step S406 whether the detected value Pon-0$slm$ is bit 0. More specifically, the controller 15 determines whether the value of the pixel spaced from the defective pixel D1 selected in step S402 by the shift amount Sslm is bit 0 in response to the modulation of bit 0 on the SLM 12.

If the answer to the determination in step S406 is affirmative with bit 0, the controller 15 provides bit 1 in response to the modulation of bit 1, and bit 0 in response to the modulation of bit 0. The SLM 12 is thus determined to be free from pixel defect. In such a case, processing proceeds to step S408.

If the answer to the determination in step S405 is non-affirmative with the detected value Pon-1$slm$ being not bit 1, or if the answer to the determination in step S406 is non-affirmative with the detected value Pon-0slm being not bit 0, the corresponding pixel on the SLM 12 is determined to be fixed to bit 0 or bit 1. Processing proceeds to step S407 to determine that the defect lies in the pixel defect on the SLM 12. Processing proceeds to step S408.

The determination of the presence or absence of the image defect Gr on the reproducing side and the image defect Gw on the recording side is performed through steps S408-S411.

In step S408, the controller 15 determines whether the detected value Pon-1r is bit 1. More specifically, the controller 15 determines whether the value of the pixel spaced from the defective pixel D1 selected in step S402 by the shift amount Sr is bit 1 in response to the modulation of bit 1 on the SLM 12. If it is determined in step S408 that the detected value Pon-1r is not bit 1, the controller 15 determines that the image defect Gr occurs on the reproducing side. The controller 15 determines in step S409 that the image defect Gr on the reproducing side is present. Processing proceeds to step S410.

If it is determined in step S408 that the detected value Pon-1r is bit 1, the controller 15 determines that the image defect Gr does not occur on the reproducing side. Processing proceeds to step S410.

In step S410, the controller 15 determines whether the detected value Pon-1w is bit 1. More specifically, the controller 15 determines whether the value of the pixel spaced from the defective pixel D1 selected in step S402 by the shift amount Sw is bit 1 in response to the modulation of bit 1 on the SLM 12. If it is determined in step S410 that the detected value Pon-1w is not bit 1, the controller 15 determines that the image defect Gw occurs on the recording side. The controller 15 determines in step S411 that the image defect Gw on the recording side is present. Processing proceeds to step S412.

If it is determined in step S410 that the detected value Pon-1w is bit 1, the controller 15 determines that the image defect Gw does not occur on the recording side. Processing proceeds to step S412.

In step S412, the controller 15 stores the content of the defect and the pixel position in association with each other. More specifically, the controller 15 stores the content of each defect determined in at least one of steps S404, S407, S409, and S411 and the pixel position of the defective pixels D1 selected in step S402 in association with each other.

Based on the stored pixel position mapping information, the controller 15 identifies the defect creation mode occurring in a collinear optical axis at the pixel position. Such mapping information may be stored on the RAM or the like in the controller 15.

In step S413, the controller 15 determines whether determination of all defective pixels D1 has been completed. If it is determined in step S413 that not all defective pixels D1 have been determined, processing returns to step S402 to select a target pixel again.

If it is determined in step S412 that the determination of all defective pixels D1 has been completed, processing proceeds to the process of FIG. 20.

FIG. 20 illustrates the determination process of the presence or absence of a defect that might occur in a collinear optical axis with the defective pixel D3. As previously discussed, the defects that might occur in a collinear optical axis with the defective pixel D3 definitely include the pixel defect on the image sensor 8 (fixed to bit 1). As a further candidate as one of the defects that might occur in a collinear optical axis with the defective pixel D3, the controller 15 determines whether a defect occurs on the recording side. More specifically, the controller 15 performs the determination process of the presence or absence of the pixel defect on the SLM 12 and the presence or absence of the image defect Gw on the recording side.

With reference to FIG. 20, the controller 15 determines in step S501 whether a defective pixel D3 is present. If it is determined in step S501 that no defective pixel D3 is present, processing proceeds to step S601 of FIG. 21.

If the answer to the determination in step S501 is affirmative with the presence of the defective pixel D3, the controller 15 selects a target pixel from the defective pixels D3 in step S502. More specifically, the controller 15 selects one pixel as a target pixel from the pixels on the image sensor 8 determined to be the defective pixels D3.

In step S503, the controller 15 determines that the defective pixel D3 thus selected is the pixel defect on the image sensor 8.

In step S504, the controller 15 determines whether the detected value Pon-1slm is bit 1. More specifically, the controller 15 determines whether the value of the pixel spaced from the defective pixel D3 selected in step S502 by the shift amount Sslm is bit 1 in response to the modulation of bit 1 on the SLM 12.

If the answer to the determination in step S504 is affirmative with the detected value Pon-1slm being bit 1, the controller 15 determines in step S505 whether the detected value Pon-0slm is bit 0. More specifically, the controller 15 determines whether the value of the pixel spaced from the defective pixel D3 selected in step S502 by the shift amount Sslm is bit 0 in response to the modulation of bit 0 on the SLM 12.

If the answer to the determination in step S505 is affirmative with the detected value Pon-0slm being bit 0, bit 1 is obtained in response to the modulation of bit 1 and bit 0 is obtained in response to the modulation of bit 0. The controller 15 thus determines that the pixel defect is not on the SLM 12. Processing proceeds to step S507.

If the answer to the determination in step S504 is non-affirmative with the detected value Pon-1slm being not bit 1, the corresponding pixel on the SLM 12 is determined to be fixed to bit 0, and if the answer to the determination in step S505 is non-affirmative with the detected value Pon-0slm being not bit 0, the corresponding pixel on the SLM 12 is determined to be fixed to bit 1. Processing proceeds to step S506 as shown in FIG. 20. The controller 15 determines that the defect is the pixel defect on the SLM 12 and then proceeds to step S507.

In step S507, the controller 15 determines whether the detected value Pon-1w is bit 1. More specifically, the controller 15 determines whether the value of the pixel spaced from the defective pixel D3 selected in step S502 by the shift amount Sw is bit 1 in response to the modulation of bit 1 on the SLM 12. If the answer to the determination in step S507 is non-affirmative with the detected value Pon-1w being not bit 1, the controller 15 determines that an image defect Gw occurs on the recording side. In step S508, the controller 15 determines that the image defect Gw on the recording side is present, and then proceeds to step S509.

If the answer to the determination in step S507 is affirmative with the detected value Pon-1w being bit 1, the controller 15 determines that the defect is not the image defect Gw on the recording side. Processing proceeds to step S509.

In step S509, the controller 15 stores the content of the defect and the pixel position in association with each other. More specifically, the controller 15 stores the content of the pixel defect on the image sensor 8, and at least one of the pixel defect on the SLM 12 determined in step S506, and the image defect Gw on the recording side determined in step S508 and the pixel position of the defective pixels D3 selected in step S502 in association with each other.

Based on the stored pixel position mapping information, the controller 15 identifies the defect creation mode occurring in a collinear optical axis at the pixel position.

In step S510, the controller 15 determines whether determination of all defective pixels D3 has been completed. If it is determined in step S510 that not all defective pixels D3 have been determined, processing returns to step S502 to select a target pixel again.

If it is determined in step S510 that the determination of all defective pixels D3 has been completed, processing proceeds to the process of FIG. 21.

FIG. 21 illustrates a modification process of modifying the setting in the oversampling process in response to the presence of a defect on the reproducing side.

In step S601, the controller 15 determines whether a defect is present on the reproducing side. The defective pixel D3, from among the defective pixels, is definitely the pixel defect on the image sensor 8 (i.e., the defect on the reproducing side). If any defective pixels D3 are present, all of the pixels occur on the reproducing side. The defective pixel D1 may not be the one on the reproducing side. The defective pixel D2 determined to be in the detected value pattern (1,1,0) is definitely a pixel defect on the SLM 12 (i.e., a defect on the recording side).

Whether any defect is present on the reproducing side is determined based on the determination of whether a defective pixel D3 is present and the determination of whether the defective pixels D1, if present, includes one of the pixel defect on the image sensor 8 and the image defect Gr on the reproducing side.

In step S601, the controller 15 determines whether a defective pixel D3 is present, and then determines whether the defective pixel D1, if present, includes one of the pixel defect on the image sensor 8 and the image defect Gr on the reproducing side.

If an affirmative answer is obtained in any of the determinations in step S601, a defect is present on the reproducing side. Processing proceeds to step S602.

If non-affirmative answer is obtained in the two determinations in step S601, no defect is present on the reproducing side. Processing ends as shown in FIG. 21.

In step S602, the controller 15 identifies an oversampling pixel block containing a defect. More specifically, the controller 15 identifies the oversampling pixel block containing a defect from among the oversampling pixel blocks on the image sensor 8 based on the information of the pixel positions of the defective pixels containing the defects on the reproducing side determined in step S601.

In step S603, the controller 15 selects a target oversampling pixel block. More specifically, the controller 15 selects one oversampling pixel block from the oversampling pixel blocks determined to contain the defective pixels in step S602.

In step S604, the controller 15 determines whether all pixels are defective. More specifically, the controller 15 determines whether all pixels within the selected oversampling pixel block are defective.

If it is determined in step S604 that all pixels are defective, processing proceeds to step S606 to exclude the corresponding oversampling pixel block from use. In other words, the controller 15 modifies the setting of the data demodulator 13 of FIG. 11 to exclude the oversampling pixel block selected in step S603 from use in a subsequent oversampling process.

Processing proceeds to step S609. The controller 15 determines whether there is a further target oversampling pixel block. If it is determined in step S609 that there is a further oversampling pixel block, processing returns to step S603 to select the oversampling pixel block. If it is determined in step S609 that there is no further oversampling pixel block, processing ends as shown in FIG. 21.

If it is determined in step S604 that not all pixels are defective, processing proceeds to step S605 to determine whether to use the remaining normal pixels. As previously discussed, the determination in step S605 allows a change to decide whether to use the normal pixel.

The determination in step S605 is performed based on information concerning whether to use the normal pixel set beforehand in response to user operation. The whole oversampling pixel block may be set to be excluded from use if a defective pixel is contained. In such a case, the determination in step S605 provides a non-affirmative answer; otherwise, the determination in step S605 provides an affirmative answer.

If it is determined in step S605 that the remaining normal pixels are not to be used, the controller 15 excludes the corresponding oversampling pixel block from use.

If it is determined in step S605 that the remaining normal pixels are to be used, processing proceeds to step S607 to exclude the defective pixel in the corresponding oversampling pixel block from use. More specifically, the controller 15 modifies the setting of the data demodulator 13 to exclude the defective pixel in the oversampling pixel block selected in step S603 from use in a subsequent oversampling pixel block.

In step S608, the controller 15 subtracts the number of defective pixels from the averaging divisor in the oversampling process. More specifically, as for the oversampling pixel block selected in step S603, the defective pixels are not used in the subsequent oversampling process, and the averaging operation is performed using as a denominator a difference between the overall number of pixels within the oversampling pixel block and the number of defective pixels. This arrangement provides a result more accurate than the averaging operation using the defective pixels.

Processing proceeds to step S609 to determine whether a next target oversampling pixel block is available. As previously discussed, if the answer to the determination in step S609 is non-affirmative, processing ends.

The present invention is not limited to the above-described embodiments.

For example, for convenience of explanation, the image defect Gw on the recording side occurs on the objective lens 4 only, and the image defect Gr on the reproducing side occurs on the expander lens 7 only in the preceding embodiments. In the recording and reproducing apparatus 1 of FIG. 11, the image defect Gw on the recording side can occur on each of the collimator lens 2 and the tilt mirror 11. The image defect Gr on the reproducing side can occur on the objective lens 6.

An image defect can occur on each of the collimator lens 2, the tilt mirror 11 and the objective lens 6. Such an image defect can be superimposed in a collinear optical axis with a pixel on the image sensor 8 determined to be one of the defective pixel D1 and the defective pixel D3.

Since the image defect on the collimator lens 2 is positioned on the side of a light source (laser diode LD) with respect to the tilt mirror 11. Even with the tilt mirror 11 tilted, the image defect on the collimator lens 2 cannot be discriminated from the image defect on the tilt mirror 11. However, if the defect creation mode is identified with defects classified as being a defect on the recording side only, a defect on the reproducing side only or defects on both the recording side and the reproducing side, the above discrimination is not a problem. The image defect on the collimator lens 2 and the image defect on the tilt mirror 11 belongs to the defects on the recording side.

To identify the defect creation mode, the presence or absence of each pixel is determined by referencing the detected value on each pixel on the image sensor 8 with the tilt mirror 11 tilted to satisfy the following conditions:

images of image defect on the collimator lens 2 and the tilt mirror 11, the pixel defect on the SLM 12, the image defect on the objective lens 4, the image defect on the objective lens 6, and the image defect on the expander lens 7 are incident on normal pixels on the image sensor 8;

images of image defect on the collimator lens 2 and the tilt mirror 11, the pixel defect on the SLM 12, the image defect on the objective lens 4, the image defect on the objective lens 6, and the image defect on the expander lens 7 are not incident on the same pixel on the image sensor 8; and images of image defect on the collimator lens 2 and the tilt mirror 11, the pixel defect on the SLM 12, the image defect on the objective lens 4, the image defect on the objective lens 6, and the image defect on the expander lens 7 are not superimposed in a collinear optical axis on the image sensor 8 with the tilt mirror 11 tilted.

A defect, if determined as a defective pixel D3 (having the detected value pattern (1,1,1)), is definitely the pixel defect on the image sensor 8 (fixed to bit 1). It is sufficient if the controller 15 determines whether a defect occurs on the recording side as well. In other words, the controller 15 determines the presence or absence of the pixel defect on the SLM 12, the presence or absence of the image defect on each of the collimator lens 2 and the tilt mirror 11, and the presence or absence of the image defect of the objective lens 4.

If any defect is found, the recording side also suffers from defect. Both the recording side and the reproducing side thus suffer from defect. If none of these elements has defect, the reproducing side only has a defect.

If the defect is determined to be a defective pixel D1 (having the detected value pattern (0,0,0)), the defect creation mode can be any of the recording side only, the reproducing side only, and both on the recording side and the reproducing side.

The controller 15 determines the presence or absence of any possible defects (including the image defect of each of the collimator lens 2 and the tilt mirror 11, the pixel defect on the SLM 12, the image defect on the objective lens 4, the image defect on the objective lens 6, the image defect on the expander lens 7, and the pixel defect on the image sensor 8).

If the determination result shows no image defect on each of the collimator lens 2 and the tilt mirror 11, no pixel defect on the SLM 12, no image defect on the objective lens 4, but shows at least one of a pixel defect on the image sensor 8, and an image defect on each of the expander lens 7 and the objective lens 6, the controller 15 determines that the defect is present on the reproducing side only.

Conversely, if the determination result shows no pixel defect on the image sensor 8, no image defect on the expander lens 7, and no image defect on the objective lens 6 but shows at least one of an image defect on each of the collimator lens 2 and the tilt mirror 11, a pixel defect on the SLM 12, and an image defect on the objective lens 4, the controller 15 determines that the defect is present on the recording side only.

If the determination result shows at least one of an image defect on each of the collimator lens 2 and the tilt mirror 11, a pixel defect on the SLM 12, and an image defect on the objective lens 4 and shows at least one of a pixel defect on the image sensor 8, an image defect on the expander lens 7, and an image defect on the objective lens 6, the controller 15 determines that the defects are present on both the recording side and the reproducing side.

In this way, the pixels determined to be the defective pixels D1 are identified as one on the recording side only, one on the reproducing side, or ones on both the recording side and the reproducing side.

When there is a possibility that an image defect occurs on each of the collimator lens 2, the tilt mirror 11 and the objective lens 6, the defect creation mode of the pixel likely to occur in a collinear optical axis with the pixel determined to be one of the defective pixel D1 and the defective pixel D3 is appropriately identified.

The recording and reproducing apparatus 1 has a structure supporting a transmissive-type hologram recording medium 5. Alternatively, the recording and reproducing apparatus 1 may have a structure supporting a reflective-type hologram recording medium 5.

Figure 22:
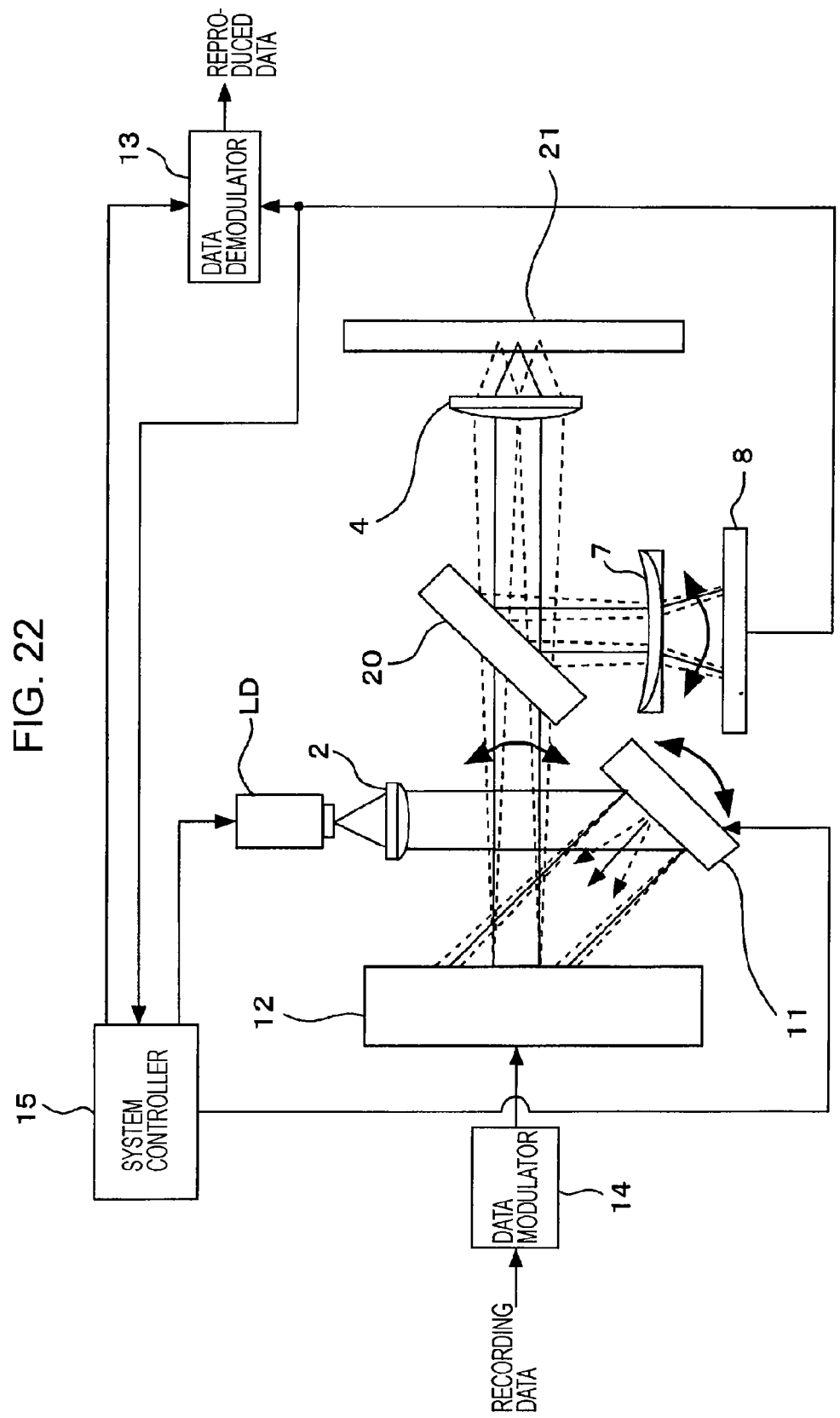
FIG. 22 illustrates a recording and reproducing apparatus as a modification of the embodiment.

FIG. 22 illustrates a recording and reproducing apparatus supporting a reflective-type hologram recording medium 21. In FIG. 22, elements identical to those described with reference to FIG. 11 are designated with the same reference numerals.

The recording and reproducing apparatus includes a polarization beam splitter (PBS) 20 to support the reflective-type hologram recording medium 21. As shown, the PBS 20 passes a laser beam guided from the laser diode LD through the collimator lens 2, the tilt mirror 11 and the SLM 12, and then guides the laser beam to the objective lens 4. As will be described below, the PBS 20 reflects as a diffracted light beam a laser light beam reflected from the reflective-type hologram recording medium 21 via the objective lens 4, thereby guiding the laser light beam to the expander lens 7 and the image sensor 8.

The reflective-type hologram recording medium 21 includes a reflective layer underneath a recording layer on which an interference pattern as recording data is formed. A diffracted light beam, which is obtained in response to the laser beam directed to the recording layer through the objective lens 4, is passed through the recording layer and then reflected from the reflective layer. The diffracted light beam obtained as the reflected light beam is incident on the objective lens 4.

The recording and reproducing apparatus includes the data demodulator 13, the data modulator 14, and the controller 15. These elements are identical to those described with reference to FIG. 11.

Defects the recording and reproducing apparatus having the structure supporting the reflective-type hologram recording medium 21 might suffer from include, in addition to the pixel defect on the SLM 12 and the pixel defect on the image sensor 8, image defects on the collimator lens 2, the tilt mirror 11, the PBS 20, the objective lens 4, and the expander lens 7.

It should be noted that an image defect occurring on the objective lens 4 in the structure of FIG. 22 is a defect common to both the recording side and the reproducing side. Two-types of defects can occur on the PBS 20. One type of defect occurring on an incident surface of the PBS 20 receiving the laser beam from the SLM 12 becomes a defect on the recording side. Another type of defect occurring on an incident surface of the PBS 20 receiving the reflected light beam from the objective lens 4 becomes a defect on the reproducing side.

In this case, the defects on the recording side include the image defect on each of the collimator lens 2 and the tilt mirror 11, the pixel defect on the SLM 12, the image defect on the PBS 20 (on the surface thereof looking toward the SLM 12), and the image defect on the objective lens 4.

The defects on the reproducing side include the image defect on the objective lens 4, the image defect on the PBS 20 (on the surface thereof looking toward the objective lens 4), the image defect on the expander lens 7, and the pixel defect on the image sensor 8.

To identify the defect creation mode, the presence or absence of each pixel is determined by tilting the mirror 11 to satisfy the following conditions:

images of image defect on each of the collimator lens 2 and the tilt mirror 11, the pixel defect on the SLM 12, the image defect on the PBS 20 (on the surface thereof looking toward the SLM 12), the image defect on the PBS 20 (on the surface thereof looking toward the objective lens 4), the image defect on the objective lens 4, and the image defect on the expander lens 7 are incident on normal pixels on the image sensor 8;

images of image defect on each of the collimator lens 2 and the tilt mirror 11, the pixel defect on the SLM 12, the image defect on the PBS 20 (on the surface thereof looking toward the SLM 12), the image defect on the PBS 20 (on the surface thereof looking toward the objective lens 4), the image defect on the objective lens 4, and the image defect on the expander lens 7 are not incident on the same pixel on the image sensor 8; and images of image defect on each of the collimator lens 2 and the tilt mirror 11, the pixel defect on the SLM 12, the image defect on the PBS 20 (on the surface thereof looking toward the SLM 12), the image defect on the PBS 20 (on the surface thereof looking toward the objective lens 4), the image defect on the objective lens 4, and the image defect on the expander lens 7 are not superimposed in a collinear optical axis on the image sensor 8 with the tilt mirror 11 tilted.

With the tilt mirror 11 tilted, pixels on the image sensor 8 receiving images of the image defect on each of the collimator lens 2 and the tilt mirror 11, the pixel defect on the SLM 12, the image defect on the PBS 20 (on the surface thereof looking toward the SLM 12), the image defect on the PBS 20 (on the surface thereof looking toward the objective lens 4), the image defect on the objective lens 4, and the image defect on the expander lens 7, and the image on the image sensor 8 determined to be defective are separately determined in terms of presence or absence.

More specifically, a defect, if determined as a defective pixel D3, is definitely the pixel defect on the image sensor 8 fixed to bit 1. It is sufficient if the controller 15 determines whether a defect occurs on the recording side as well. In other words, the controller 15 determines the presence or absence of the image defect on each of the collimator lens 2 and the tilt mirror 11, the pixel defect on the SLM 12, the image defect on the PBS 20 (on the surface thereof looking toward the SLM 12), and the image defect on the objective lens 4. Based on this determination, the controller 15 determines whether a defect also occurs on the recording side, i.e., whether a defect occurs on the reproducing side only or on both the recording side and the reproducing side.

If the defect is determined to be a defective pixel D1, the defect creation mode can be any of the recording side only, the reproducing side only, and both the recording side and the reproducing side. The controller 15 determines the presence or absence of each defect determined to be the defective pixel D1 and then identifies the defect creation mode based on the determination result of the presence or absence of each pixel.

As previously discussed, an image defect, if determined to be present on the objective lens 4, is the ones on both the recording side and the reproducing side.

To perform the defect determination process, a test medium is preferably used for the hologram recording medium. The reflective-type hologram recording medium 21 reflects the light modulated by the SLM 12 and the reflected light is then detected by the image sensor 8. The reflectance of the reflective-type hologram recording medium 21 is preferably high to provide a sufficient and stable value to be detected by the image sensor 8. A test hologram recording medium for use in the defect determination process by the recording and reproducing apparatus of FIG. 22 is made of a reflective layer having a reflectance higher than standard value. The hologram recording medium is not necessarily a recording medium and may be a medium made of a material having a relatively high reflectance.

To achieve a high-speed determination process in accordance with embodiments, the defective pixel D1 is determined by referencing the value of each pixel in response to the modulation of bit 1 in accordance with the detected value pattern of FIG. 12B and defect free state is determined based on the detected value responsive to the modulation of bit 1/bit 0.

If the speed of the determination process is not important, the values of all pixels may be obtained in response to the modulation of bit 1/bit 0 and with the laser diode LD off. In accordance with the detected value pattern obtained, the normal pixels, the pixel defect on the SLM 12, the defective pixel D3 and the defective pixel D1 are determined.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A recording and reproducing apparatus for recording data to and reproducing data from a hologram recording medium, comprising:

light emitting means for emitting light to be directed to the recording medium set at a predetermined position;

spatial light modulation means for performing spatial light modulation on incident light by pixels;

an image sensor for receiving incident light by pixels and converting the incident light into an electrical signal;

an optical system for guiding the light emitted by the light emitting means to the recording medium via the spatial light modulation means while guiding, to the image sensor, light reflected from the recording medium in response to the light emitted by the light emitting means; and determination means for controlling the spatial light modulation means so that each pixel within the spatial light modulation means modulates the light incident thereon with a high/low intensity modulation in light intensity with the light emitting means remaining switched on, and for determining the presence or absence of a defect in an optical path based on a determination as to whether a value indicative of high/low light intensity is obtained as a value detected on each pixel in the image sensor in response to the high/low intensity modulation, wherein the determination means determines, as being defective, pixels that provide the detected values, arising from the high/low light intensity modulation, failing to be values representing the high/low light intensity values, acquires, with the light emitting means switched off, values of the defective pixels that provide at least the values responsive to the high/low light intensity, and determines whether a detected pattern of high/high/low light intensity inclusive of the detected value is obtained in order to determine that a defect occurring in a collinear optical axis with the defective pixel is a pixel defect in the spatial light modulation means.

2. A recording and reproducing apparatus for recording data to and reproducing data from a hologram recording medium, comprising:

light emitting means for emitting light to be directed to the recording medium set at a predetermined position;

spatial light modulation means for performing spatial light modulation on incident light by pixels;

an image sensor for receiving incident light by pixels and converting the incident light into an electrical signal;

an optical system for guiding the light emitted by the light emitting means to the recording medium via the spatial light modulation means while guiding, to the image sensor, light reflected from the recording medium in response to the light emitted by the light emitting means;

determination means for controlling the spatial light modulation means so that each pixel within the spatial light modulation means modulates the light incident thereon with a high/low intensity modulation in light intensity with the light emitting means remaining switched on, and for determining the presence or absence of a defect in an optical path based on a determination as to whether a value indicative of high/low light intensity is obtained as a value detected on each pixel in the image sensor in response to the high/low intensity modulation; and image position shifting means, arranged in an optical axis between the light emitting means and the spatial light modulation means, for shifting a position of an image incident on the image sensor by varying a light incident angle with respect to the spatial light modulation means.

3. The recording and reproducing apparatus according to claim 2, wherein for a first defective pixel indicating a detected value pattern of high/high/high light intensity and a second defective pixel indicating a detected value pattern of low/low/low light intensity, from among patterns made of the detected values resulting from the high light intensity modulation, and the low light intensity modulation and the detected value with the light emitting means switched off, the determination means controls the image position shifting means to shift an incident position of each image on the image sensor so that an image of a pixel defect in the spatial light modulation means likely to occur in a collinear optical axis with one of the first defective pixel and the second defective pixel and an image of an image defect likely to occur in the optical system in a collinear optical axis with one of the first defective pixel and the second defective pixel are incident on normal pixels on the image sensor, but not incident on the same pixel on the image sensor, and not superimposed in a collinear optical axis on the image sensor, wherein for the first detective pixel, the determination means acquires a value obtained through light intensity modulation of the spatial light modulation with the light emitting means remaining switched on, at each of pixels on the image sensor receiving the image of the pixel defect in the spatial light modulation means likely to occur in a collinear optical axis with the first detective pixel, and the image of an image defect on a recording side occurring at a location on the side the light emitting means with respect to the recording medium from among the image defects likely to occur in the optical system in a collinear optical axis with the first defective pixel, and determines based on the detected value whether the spatial light modulation means has a pixel defect in a collinear optical axis with the first defective pixel and whether the recording side has an image defect in a collinear optical axis with the first defective pixel, and wherein for the second defective pixel, the determination means acquires a value obtained through light intensity modulation of the spatial light modulation with the light emitting means remaining switched on, at the second defective pixel, and at each of pixels on the image sensor receiving an image of an image defect in the spatial light modulation means likely to occur in a collinear optical axis with the second defective pixel, an image of an image defect occurring at a location on the side of the light emitting means with respect to the recording medium from among image defects likely to occur in the optical system in a collinear optical axis with the second defective pixel, and an image of an image defect on a reproducing side occurring at a location on the side of the image sensor with respect to the recording medium from among image defects likely to occur in the optical system in a collinear optical axis with the second defective pixel, and based on the detected values, determines whether the spatial light modulation means has a pixel defect in a collinear optical axis with the second defective pixel, whether the recording side has an image defect in a collinear optical axis with the second defective pixel, whether the reproducing side has an image defect in a collinear optical axis with the second defective pixel, and whether the image sensor has a pixel defect in a collinear optical axis with the second defective pixel.

4. The recording and reproducing apparatus according to claim 2, wherein the image position shifting means comprises a tilt mirror.

5. The recording and reproducing apparatus according to claim 4, wherein the image position shifting means comprises a tilt minor.

6. A defect determination method for a recording and reproducing apparatus for recording data to and reproducing data from a hologram recording medium, the apparatus including light emitting means for emitting light to be directed to the recording medium set at a predetermined position, spatial light modulation means for performing spatial light modulation on incident light by pixels, an image sensor for receiving incident light by pixels and converting the incident light into an electrical signal, an optical system for guiding the light emitted by the light emitting means to the recording medium via the spatial light modulation means while guiding, to the image sensor, light reflected from the recording medium in response to the light emitted by the light emitting means, and determination means for controlling the spatial light modulation means so that each pixel within the spatial light modulation means modulates the light incident thereon with a high/low intensity modulation in light intensity with the light emitting means remaining switched on, and for determining the presence or absence of a defect in an optical path based on a determination as to whether a value indicative of high/low light intensity is obtained as a value detected on each pixel in the image sensor in response to the high/low intensity modulation, the method comprising:

controlling each pixel of the spatial light modulation means to modulate the incident light with the high/low light intensity in light intensity with the light emitting means remaining switched on;

determining whether a defect occurs in an optical path based on a determination whether a value indicative of a high/low light intensity is obtained as a value detected at each pixel of the image sensor in response to the high/low light intensity modulation;

determining, as being defective, pixels that provide the detected values, arising from the high/low light intensity modulation, failing to be values representing the high/low light intensity values;

acquiring, with the light emitting means switched off, values of the defective pixels that provide at least the values responsive to the high/low light intensity; and determining whether a detected pattern of high/high/low light intensity inclusive of the detected value is obtained in order to determine that a defect occurring in a collinear optical axis with the defective pixel is a pixel defect in the spatial light modulation means.

* * * * *